United States Patent
Henry et al.

(10) Patent No.: US 12,230,266 B1
(45) Date of Patent: Feb. 18, 2025

(54) DATA ROUTING IN A MULTI-ASSISTANT CONTEXT

(71) Applicant: Amazon Technologies, Inc., Seattle, WA (US)

(72) Inventors: David Henry, New York, NY (US); Kenneth Chung Leung Chan, Burnaby (CA); Akshai Gopalakrishnan Prabhu, Toronto (CA); Yilin Zhu, North York (CA); Alain Soquet, Mialet (FR)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 17/957,270

(22) Filed: Sep. 30, 2022

(51) Int. Cl.
  *G10L 15/22* (2006.01)
  *G10L 15/08* (2006.01)

(52) U.S. Cl.
  CPC ............. *G10L 15/22* (2013.01); *G10L 15/08* (2013.01); *G10L 2015/088* (2013.01); *G10L 2015/223* (2013.01)

(58) Field of Classification Search
  CPC ... G10L 15/22; G10L 15/08; G10L 2015/088; G10L 2015/223
  USPC ........................................ 704/231, 246, 251
  See application file for complete search history.

(56) References Cited

U.S. PATENT DOCUMENTS

| | | | |
|---|---|---|---|
| 9,721,570 B1 | 8/2017 | Beal et al. | |
| 10,217,453 B2 | 2/2019 | Stevans et al. | |
| 10,218,651 B2 | 2/2019 | Schubert et al. | |
| 10,353,906 B2 | 7/2019 | Souche et al. | |
| 10,706,847 B2 | 7/2020 | Seo et al. | |
| 10,832,681 B1 | 11/2020 | Jethva | |
| 10,909,442 B1 | 2/2021 | Szarvas et al. | |
| 10,911,910 B2 | 2/2021 | Park et al. | |
| 11,037,556 B2 | 6/2021 | Rangarajan et al. | |
| 11,100,923 B2 | 8/2021 | Fainberg et al. | |
| 11,152,003 B2 | 10/2021 | O'Donovan | |
| 11,164,570 B2 | 11/2021 | Nadkar et al. | |
| 11,188,808 B2 | 11/2021 | Wang et al. | |
| 11,393,474 B2 | 7/2022 | Lee et al. | |
| 11,455,987 B1 | 9/2022 | Dabas et al. | |
| 11,538,478 B2 | 12/2022 | Bobbili et al. | |
| 11,563,815 B2 | 1/2023 | Shetty | |
| 11,727,925 B2 | 8/2023 | Sharifi et al. | |
| 11,763,809 B1 | 9/2023 | Bobbili et al. | |

(Continued)

OTHER PUBLICATIONS

U.S. Non-Final Office Action issued on Jan. 2, 2025 for U.S. Appl. No. 17/957,271.

*Primary Examiner* — George C Monikang
(74) *Attorney, Agent, or Firm* — Pierce Atwood LLP

(57) ABSTRACT

Techniques for routing data, in a system including multiple assistants, are described. A user device may store configuration data for a virtual assistant, where the configuration data includes a virtual assistant identifier, one or more resource identifiers, and optionally a virtual assistant name. A resource identifier may correspond to a component or device(s) of the virtual assistant. When the user device receives event data associated with a virtual assistant identifier, the user device may use stored configuration data to determine a resource identifier(s) associated with the virtual assistant identifier, associated with the event data. The user device may thereafter send the event data to the component and/or device(s) corresponding to the determined resource identifier(s).

20 Claims, 16 Drawing Sheets

(56) References Cited

U.S. PATENT DOCUMENTS

| | | |
|---|---|---|
| 11,783,831 B1 | 10/2023 | Lantin et al. |
| 11,973,663 B2 | 4/2024 | Yarabolu et al. |
| 11,984,123 B2 | 5/2024 | Maury et al. |
| 11,991,253 B2 | 5/2024 | Kaplan |
| 12,001,614 B2 | 6/2024 | Udall et al. |
| 12,052,315 B2 | 7/2024 | Cosman et al. |
| 12,057,961 B2 | 8/2024 | Crettenand et al. |
| 12,112,001 B1 | 10/2024 | Shen et al. |
| 12,130,847 B2 | 10/2024 | Koneru et al. |
| 12,142,298 B1 | 11/2024 | Kottur et al. |
| 2015/0242760 A1 | 8/2015 | Miao et al. |
| 2018/0204569 A1 | 7/2018 | Nadkar et al. |
| 2018/0293484 A1 | 10/2018 | Wang et al. |
| 2019/0332400 A1 | 10/2019 | Spoor et al. |
| 2021/0357496 A1* | 11/2021 | Lewis .................. G06F 16/433 |
| 2022/0129556 A1 | 4/2022 | Chen et al. |
| 2022/0157323 A1 | 5/2022 | Verma et al. |
| 2022/0245606 A1 | 8/2022 | Chauhan et al. |
| 2023/0050655 A1 | 2/2023 | Song et al. |
| 2023/0131099 A1 | 4/2023 | Anamandra et al. |
| 2023/0179855 A1 | 6/2023 | Liu et al. |
| 2023/0297849 A1 | 9/2023 | Cheng et al. |
| 2023/0298593 A1 | 9/2023 | Ramos et al. |
| 2024/0021205 A1 | 1/2024 | Singh et al. |
| 2024/0086461 A1 | 3/2024 | Varakin |
| 2024/0146776 A1 | 5/2024 | Hansen et al. |

* cited by examiner

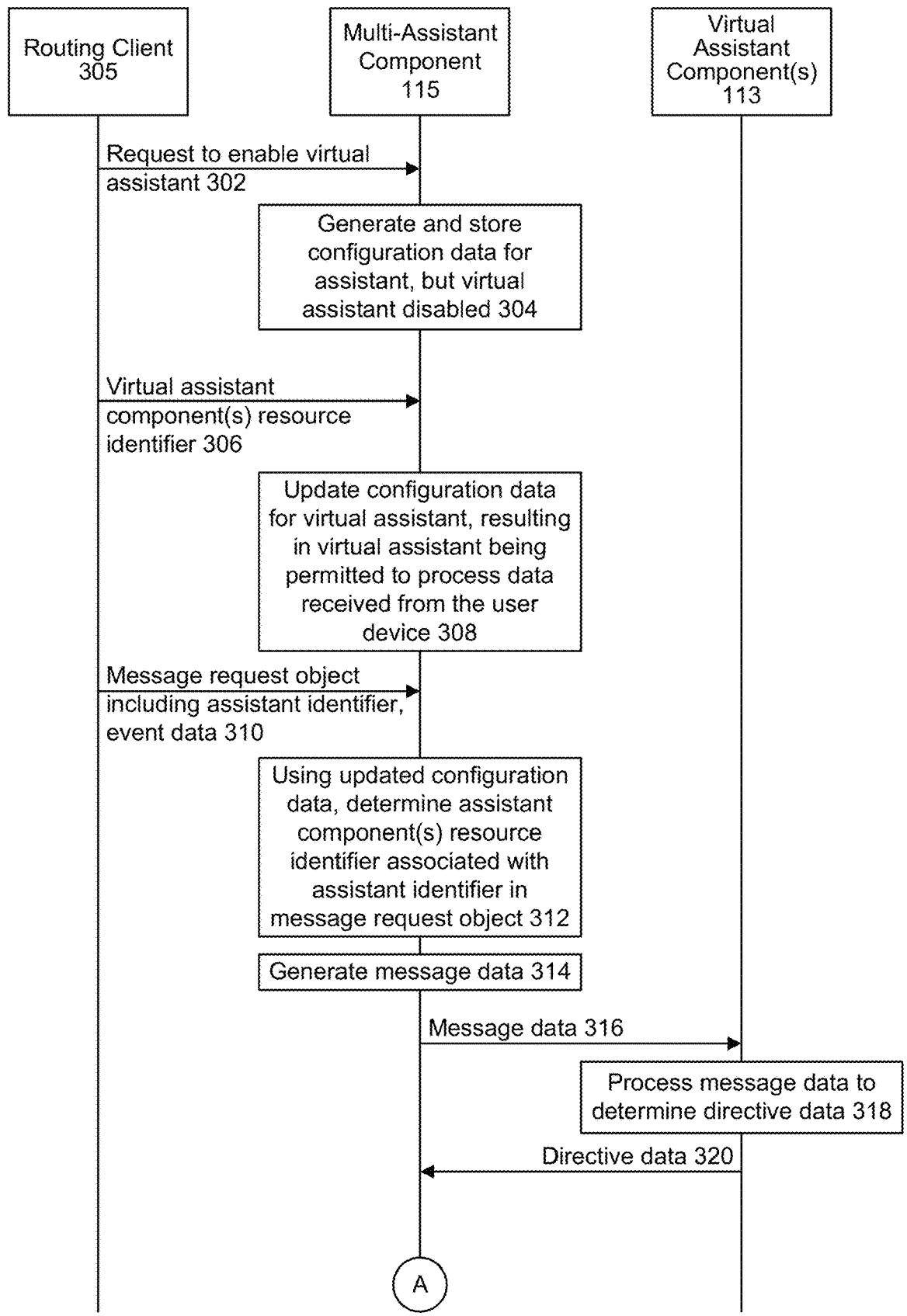

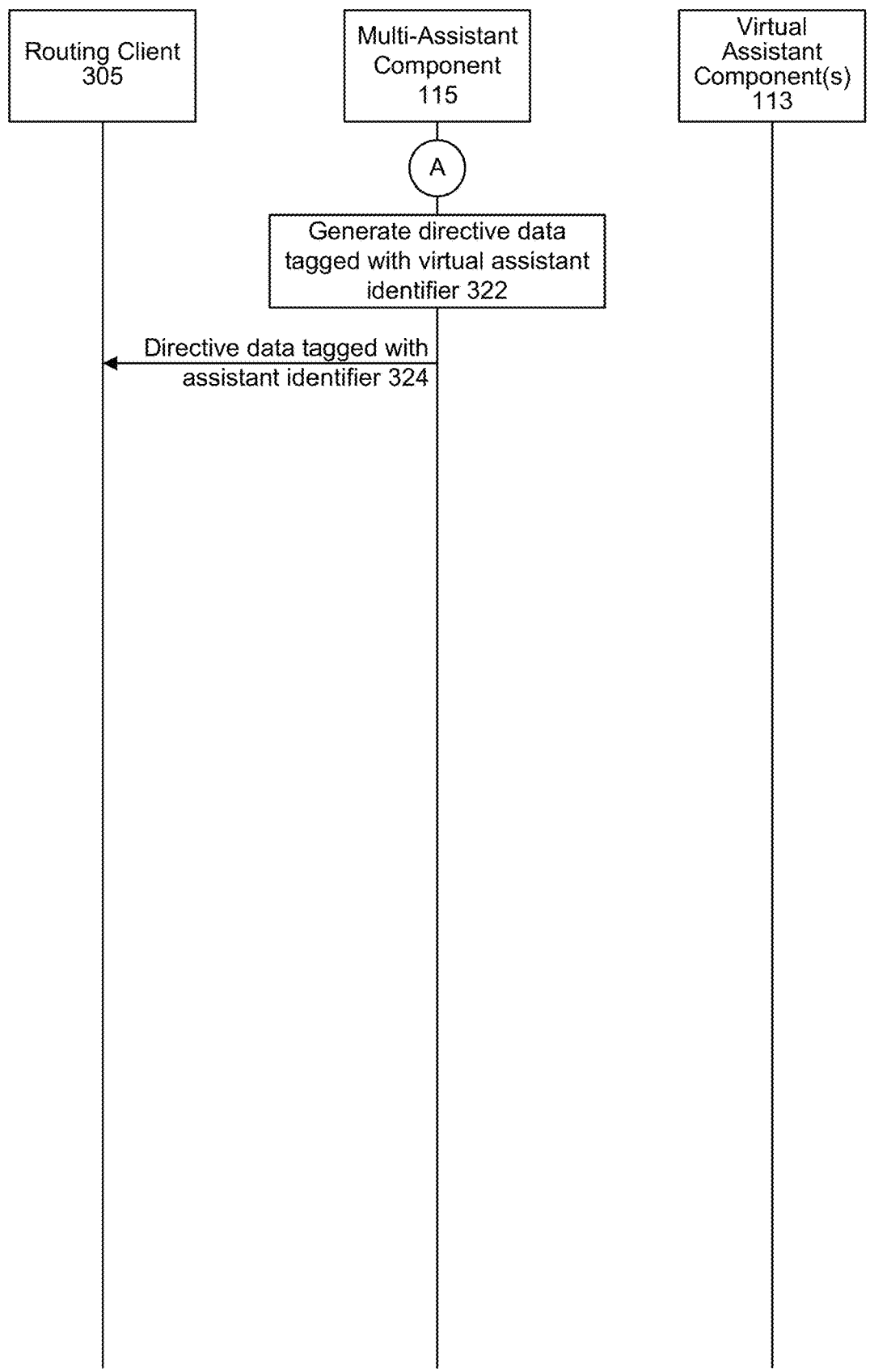

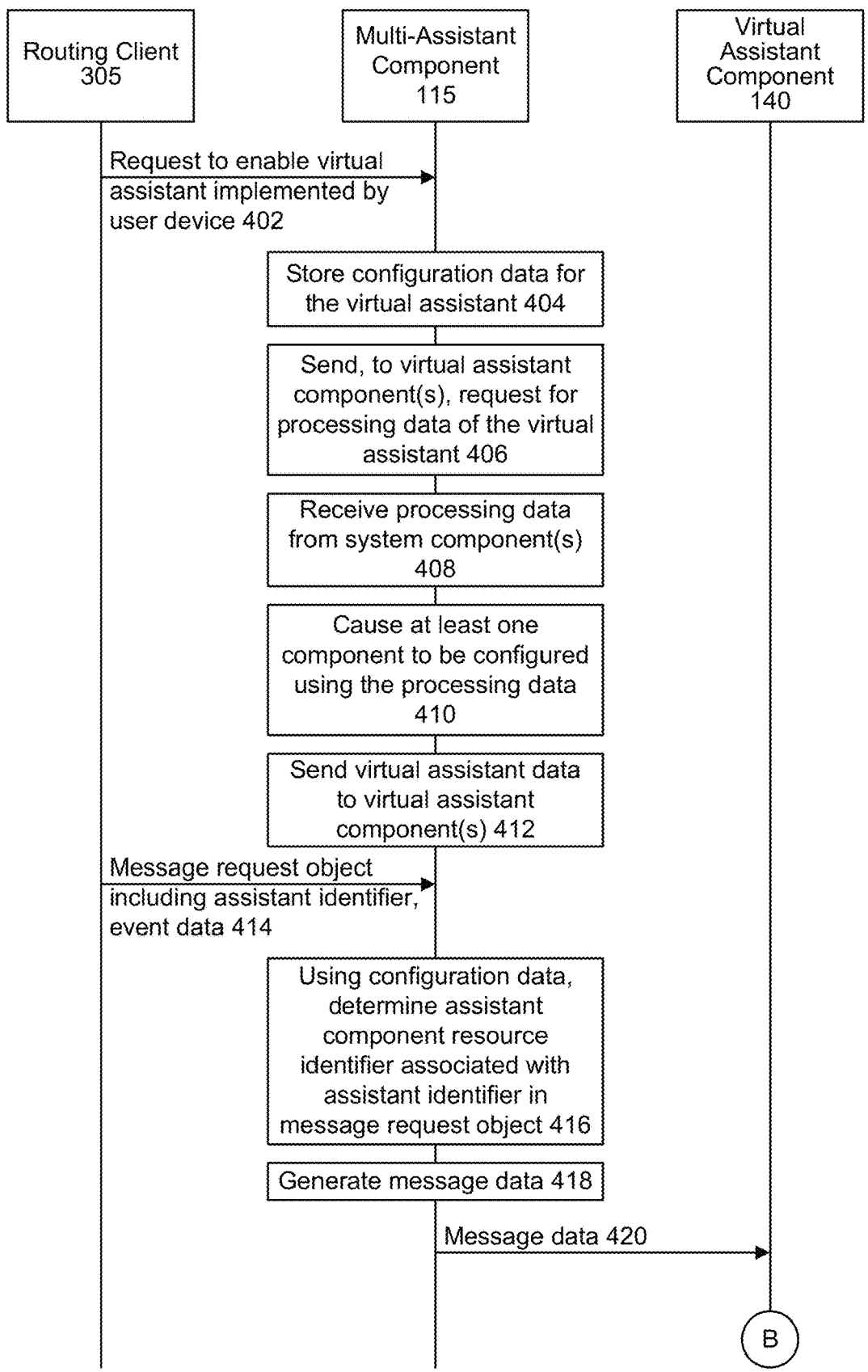

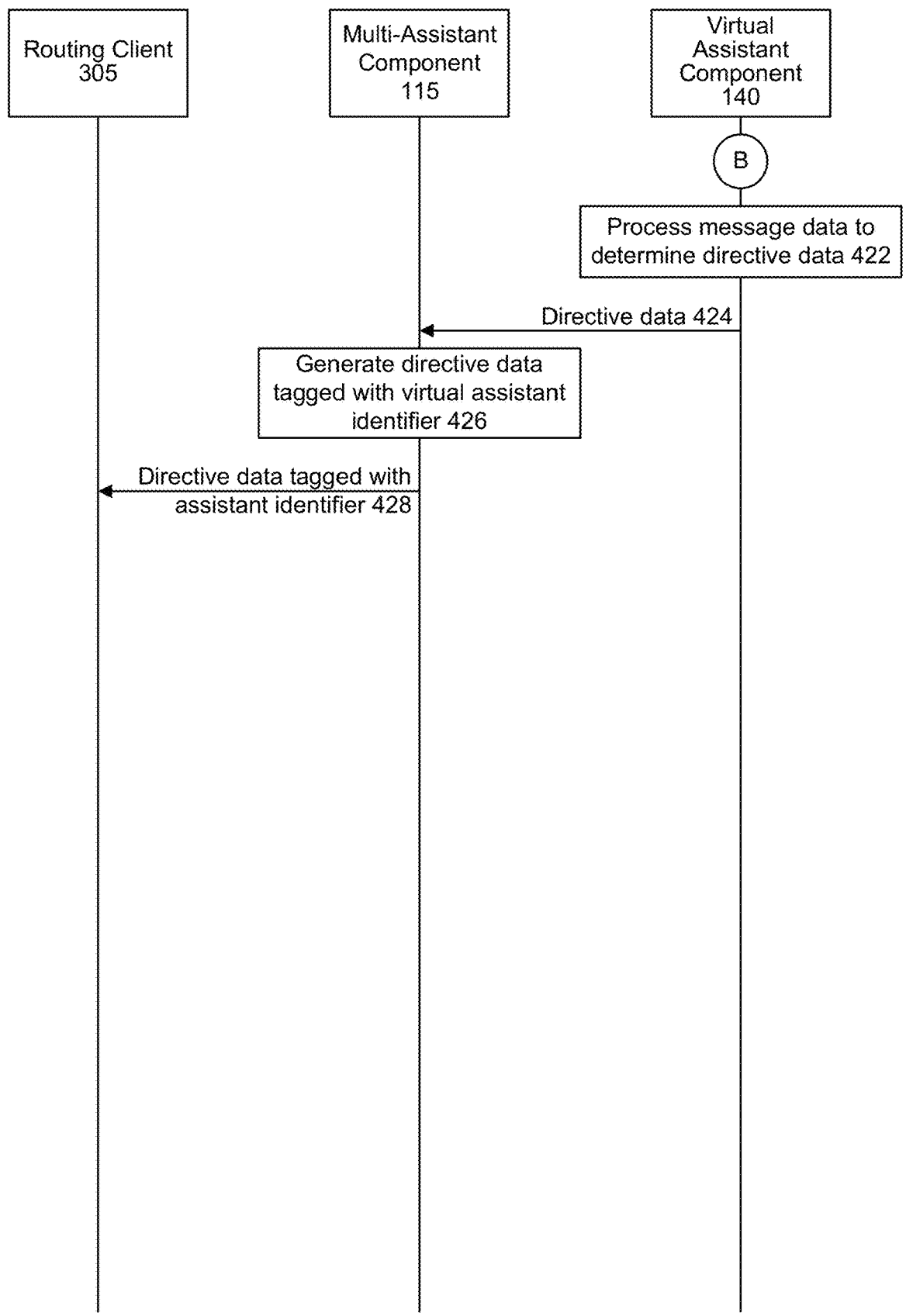

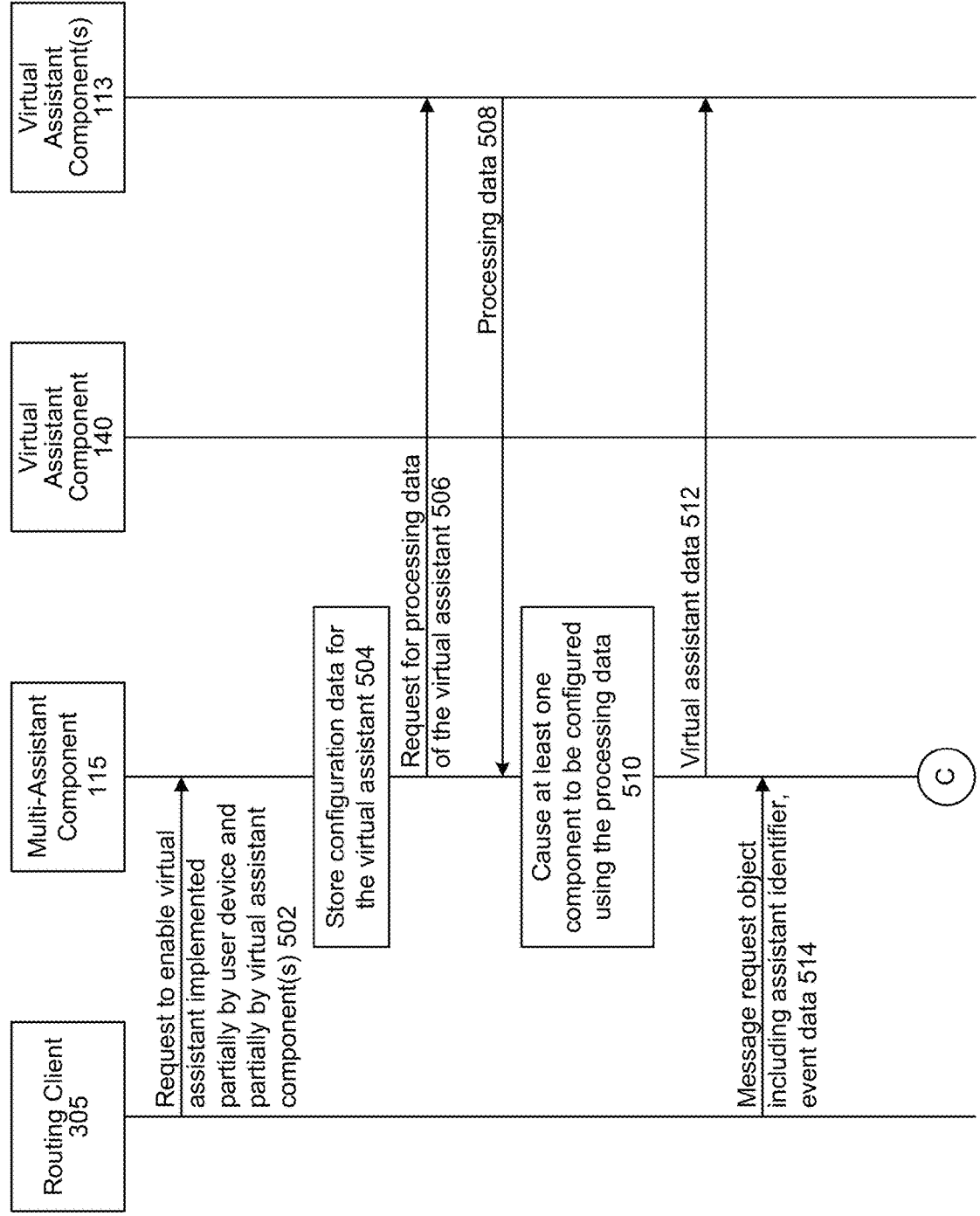

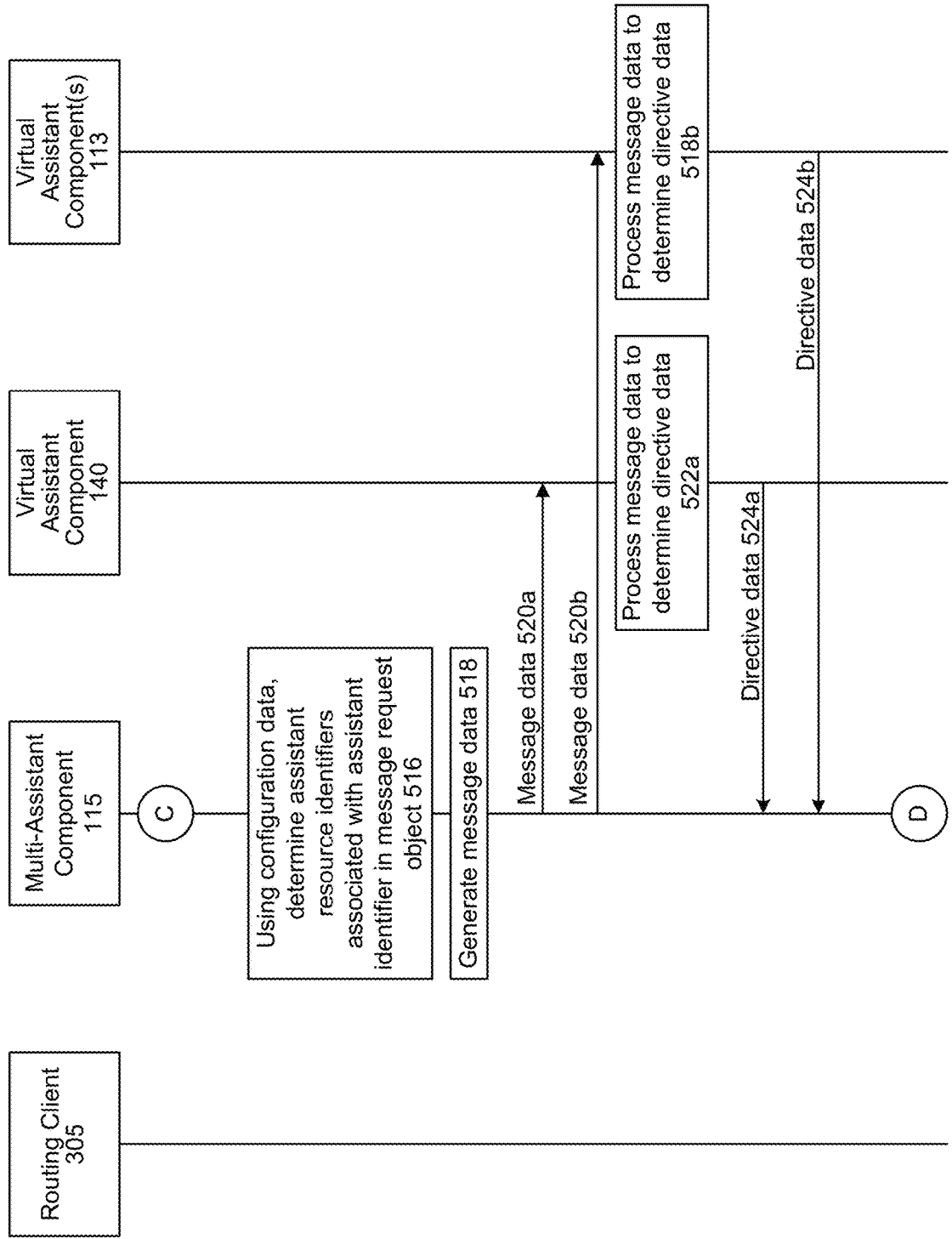

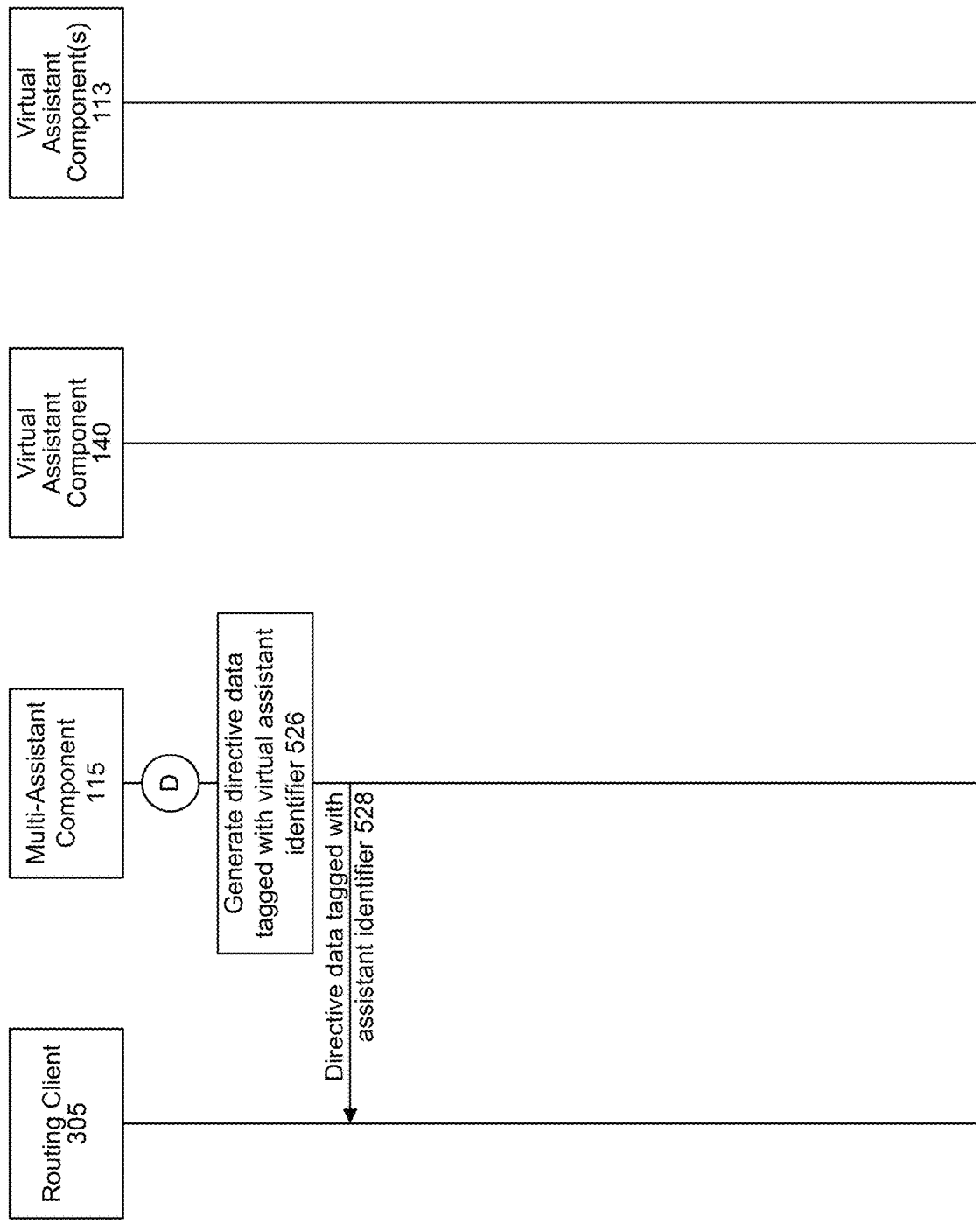

DATA ROUTING IN A MULTI-ASSISTANT CONTEXT

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 3A and 3B are a signal flow diagram illustrating configuration of a virtual assistant implemented by a virtual assistant component(s) in communication with a user device, and routing of a message to the virtual assistant component(s), according to embodiments of the present disclosure.

FIGS. 4A and 4B are a signal flow diagram illustrating configuration of a virtual assistant implemented by a virtual assistant component of a user device, and routing of a message to the virtual assistant component, according to embodiments of the present disclosure.

FIGS. 5A through 5C are a signal flow diagram illustrating configuration of a virtual assistant implemented by a virtual assistant component(s) in communication with a user device and a virtual assistant component of the user device, and routing of a message to the virtual assistant component(s) and the virtual assistant component, according to embodiments of the present disclosure.

DETAILED DESCRIPTION

Figure 1:
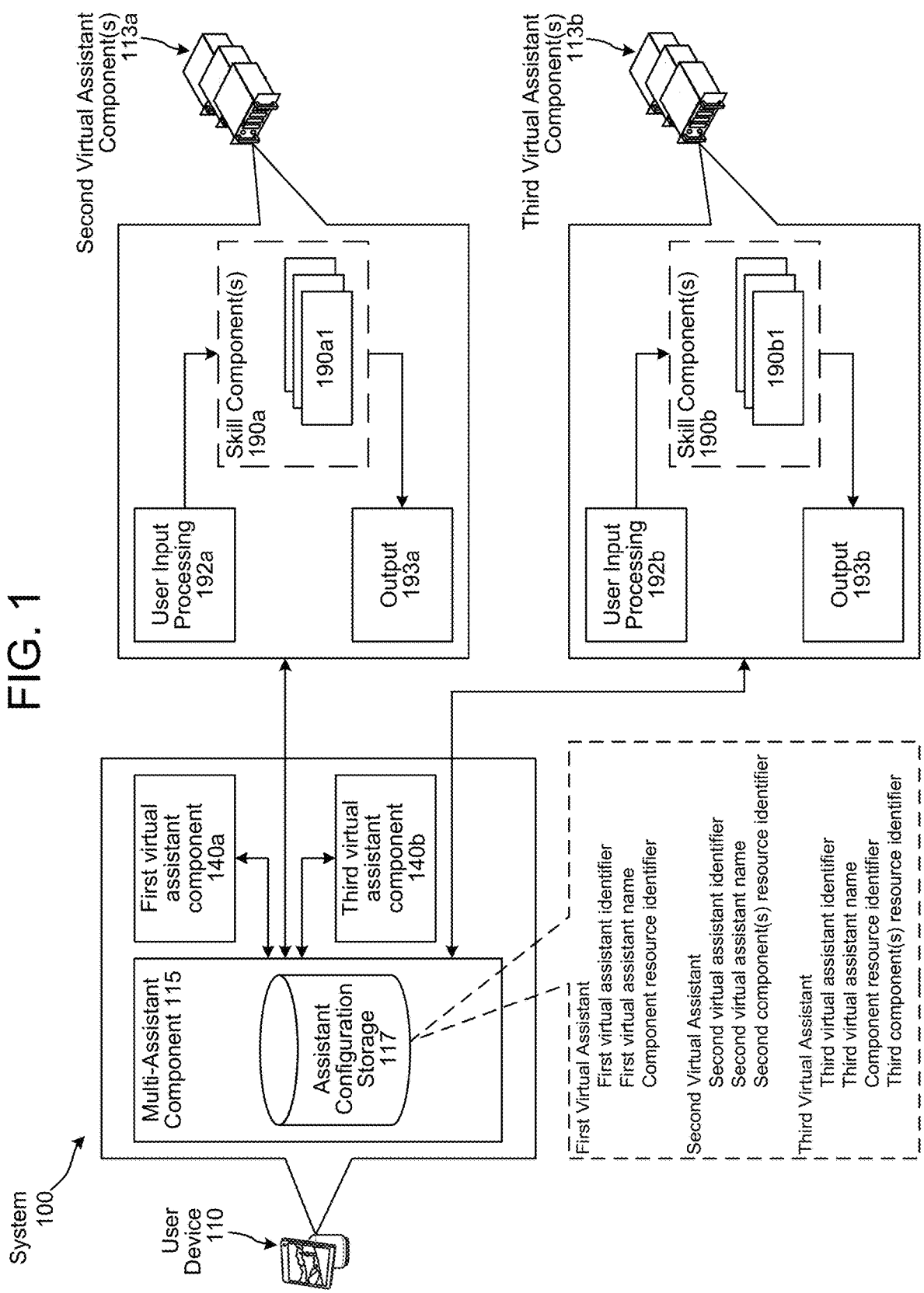
FIG. 1 is a conceptual diagram illustrating a system for implementing two or more virtual assistant configurations, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Natural language generation (NLG) is a field of artificial intelligence concerned with automatically transforming data into natural language (e.g., English) content. Text-to-speech (TTS) is a field of computer science concerning transforming textual and/or other data into audio data that is synthesized to resemble human speech.

A system of the present disclosure may implement more than one virtual assistant. As used herein, an "assistant" or "virtual assistant" refers to one or more computing components (e.g., an ASR component, a NLU component, a NLG component, a TTS component, and optionally one or more other components) and/or assistant computing devices that are implemented together to respond to user inputs. Processing using such components may be coordinated around specific tasks associated with the virtual assistant (e.g., a vehicle virtual assistant, hotel virtual assistant, etc.), personality of a virtual assistant (e.g., one that specifically responds with certain words selected by an NLG component or uses certain voice characteristics for a TTS component), or other computing attributes.

For example, the system may include a first virtual assistant implemented as a first group of components (e.g., a first ASR component, a first NLU component, a first NLG component, and/or a first TTS component), a second virtual assistant implemented as a second group of components (e.g., a second ASR component, a second NLU component, a second NLG component, and/or a second TTS component), etc. In some situations, the first virtual assistant may be configured to process and respond to one or more different user inputs than the second virtual assistant (e.g., in situations where the first virtual assistant communicates with one or more different skill components than the second virtual assistant).

A virtual assistant may be implemented wholly by a user device, meaning all the components of the virtual assistant may be implemented by the user device. Alternatively, all the components of the virtual assistant may be implemented by system component(s) separate from but in communication with the user device via one or more networks. Alternatively, one or more components of the virtual assistant may be implemented by the user device, while one or more other components of the virtual assistant may be implemented by the system component(s). In some embodiments, at least some of the system component(s) may be in or part of a cloud computing environment.

As used herein, a "skill component" refers to software that may be placed on a machine or a virtual machine (e.g., software that may be launched in a virtual instance when called). A skill component may be software customized to process NLU output data and perform one or more actions as indicated by a business entity, device manufacturer, user, etc. What is described herein as a skill component may be referred to using many different terms, such as an action, bot, app, or the like.

The present disclosure provides systems and methods for routing data (e.g., user input) to appropriate virtual assistant components and/or devices for processing. A user device may store configuration data for a set of virtual assistants. The configuration data for each virtual assistant may include a virtual assistant identifier for the virtual assistant, as well as a resource identifier of a component of the virtual assistant, in the case where the component is implemented by the user device. After storing the configuration data, the user device may receive event data associated with the virtual assistant identifier (e.g., event data relating to a user input invoking the virtual assistant). Using the configuration data, the user device may determine the virtual assistant identifier, associated with the event data, is associated with the aforementioned resource identifier of the component of the virtual assistant. The event data may thereafter be sent to the component for processing.

After sending the event data, the user device may receive, from the component of the virtual assistant, directive data, which in some cases can be tagged with the resource identifier of the component of the virtual assistant. The directive data may correspond to an action to be performed in response to the user input. Using the configuration data, the user device may determine the virtual assistant identifier that is associated with the resource identifier as tagged to the directive data or determined based on the source of the directive data. Thereafter, the user device may generate updated directive data tagged with the virtual assistant identifier instead of the resource identifier, and the user device may send the updated directive data to the source of the aforementioned event data.

In some embodiments, the user device may store the configuration data, of the virtual assistant, which can further include a resource identifier of a component(s) implementing a portion of the functionality of the virtual assistant, where the component(s) is in communication with the user device via at least one network, and where storing of the configuration data to further include the resource identifier of the component(s) enables the functionality of the virtual assistant to be implemented partially by the user device and partially by the component(s).

The user device may receive event data associated with the virtual assistant identifier. Using the configuration data, the user device may determine the virtual assistant identifier, as associated with the event data, is associated with the resource identifiers of the component (implemented by the user device) and component(s) (in communication with the user device) of the virtual assistant. Based thereon, the user device may send the event data to both the component and the component(s) for processing.

In some embodiments, the user device may receive, from a device in communication with the user device via at least one network, directive data including a payload and the virtual assistant identifier. The user device may identify a routing rule associated with the virtual assistant identifier, where the routing rule indicates a type of processing capable of being performed by the component of the virtual assistant. The user device may determine the payload, of the directive data, corresponds to the type of processing capable of being performed by the component of the virtual assistant and, based thereon, may send the payload to the virtual assistant component for processing.

In some embodiments, the user device may receive a request to enable a component to receive notification of a change in availability status of the virtual assistant. The request may include an identifier of the component. In response to the request, the user device may store an association between the virtual assistant identifier and the identifier of the component, thereby enabling the component to receive notification of a change in availability status of the virtual assistant.

In some embodiments, after storing the configuration data of the virtual assistant, the user device may receive an input requesting the virtual assistant be disabled (e.g., if the user no longer wishes to use the virtual assistant). In response to the request, the user device may delete the configuration data.

In some embodiments, configuration data, for a virtual assistant implemented by a user device, may not initially be stored by the user device. Rather, after the user device receives a user input requesting a virtual assistant be enabled, the user device may send an indication of the user input to a virtual assistant system component(s). In response thereto, the virtual assistant system component(s) may send, to the user device, configuration data for the virtual assistant, and optionally one or more trained machine learning models for performing processing corresponding to the virtual assistant (e.g., a wakeword detection model configured to detect a spoken wakeword of the virtual assistant, an ASR model configured to perform ASR processing with respect to at least one user input capable of being processed by the virtual assistant, and/or a NLU model configured to perform NLU processing with respect to at least one user input capable of being processed by the virtual assistant.

In some embodiments, in response to the system component(s) receiving the foregoing register, the system component(s) may configure a companion application, installed on the user device, to include a graphical user interface that displays the register (e.g., virtual assistant names, wakewords usable to invoke the virtual assistants, etc.).

In some embodiments, the virtual assistant's configuration data may include a virtual assistant name. The user device may receive a spoken natural language user input (e.g., utterance) including a wakeword. The user device may determine the wakeword corresponds to the virtual assistant name and/or virtual assistant identifier and, based thereon, may determine that the spoken natural language user input is to be processed using the virtual assistant.

In some embodiments, the user device may store configuration data for more than one assistant. For example, the user device may store configuration data for a second virtual assistant, where the configuration data includes a virtual assistant identifier, of the second virtual assistant, a resource identifier of a component of the second virtual assistant, and optionally a name of the second virtual assistant.

The teachings of the present disclosure provide, among other things, a beneficial user experience by enabling a user to interact with different assistants using a single user device.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for implementing two or more assistants. The system 100 may include a user device 110 in communication with a second virtual assistant component(s) 113a and a third virtual assistant component(s) 113b via a network(s) 199. The network(s) 199 may include the Internet and/or any other wide—or local-area network, and may include wired, wireless, and/or cellular network hardware.

Although FIG. 1 illustrates the second virtual assistant component(s) 113a and the third virtual assistant component(s) 113b as having similar components in a similar arrangement, the components, functions, and/or architectures of the second virtual assistant component(s) 113a and the third virtual assistant component(s) 113b may differ. In addition, some or all of the components and/or functions of one or both of the second virtual assistant component(s) 113a and the third virtual assistant component(s) 113b may reside on, or be performed by, the system component(s) 120 illustrated in and described with respect to FIG. 8 herein below. Moreover, it is noted that further possible components of the user device 110 are illustrated in and described with respect to FIG. 9 herein below.

As illustrated in FIG. 1, the user device 110 may include a multi-assistant component 115. The multi-assistant component 115 is configured to manage the sending of data to components of different assistants implemented by the user device 110 and/or an assistant component(s), such as the second virtual assistant component(s) 113a and the third virtual assistant component(s) 113b.

The multi-assistant component 115 may include a virtual assistant configuration storage 117 that stores configuration data for two or more assistants. A virtual assistant's configuration data includes a virtual assistant identifier unique to the virtual assistant (i.e., a virtual assistant identifier that is not shared by any other assistant of the system 100). The virtual assistant identifier can be unique globally, i.e., across all types of user devices that support virtual assistants, or locally unique within the operating environment of the user device and supporting services. A virtual assistant's configuration data may also include a virtual assistant name that identifies the virtual assistant, but which need not be unique to the virtual assistant (i.e., may be used by more than one assistant). In some situations, a virtual assistant's name may be unique to the virtual assistant, and may be included in a user input to indicate the user input is to be processed using the virtual assistant. In the situation where a virtual assistant is implemented only by the user device 110, the virtual assistant's configuration data may include a resource identifier of a component of the virtual assistant as implemented by the user device 110. In the situation where a virtual assistant is implemented only by a component(s) (e.g., the second virtual assistant component(s) 113a or the third virtual assistant component(s) 113b) separate from but in communication with the user device 110 via one or more networks, the virtual assistant's configuration data may include a resource identifier of the component(s). In the situation where a virtual assistant is implemented partially by the user device 110a and partially by a component(s) (e.g., the second virtual assistant component(s) 113a or the third virtual assistant component(s) 113b) separate from but in communication with the user device 110 via one or more networks, the virtual assistant's configuration data may include a first resource identifier of a component of the virtual assistant as implemented by the user device 110, and a second resource identifier of the component(s) separate from but in communication with the user device 110a via the one or more networks.

A resource identifier, of a virtual assistant's component (implemented by the user device 110) or component(s) (in communication with the user device 110), may be a Uniform Resource Identifier (URI), a Uniform Resource Locator (URL), or other identifier. A URI is a unique sequence of characters that identifies a logical or physical resource used by web technologies. A URI may provide a means of locating and retrieving information resources on a network (either on the Internet or on another private network, such as a computer filesystem or an Intranet); these are URLs. A URL provides the location of the resource, whereas a URI identifies the resource by name at the specified location or URL. As another example, a resource identifier may indicate an Internet Protocol (IP) address and port of the virtual assistant's component (implemented by the user device 110) or component(s) (in communication with the user device 110). An example URI of a virtual assistant's component, implemented by the user device 110, is "localhost:9090."

In some embodiments, a virtual assistant's configuration data may include a "LocalEnabled" field. The LocalEnabled field may have a Boolean value of "false" if the virtual assistant does not include a component implemented by the user device 110. Conversely, the LocalEnabled field may have a Boolean value of "True" if the virtual assistant has a component implemented by the user device 110. The virtual assistant configuration data can include any other information that enables the location of or operation of the virtual assistant including policy information, capabilities, permissions, and similar data related to the support of the virtual assistant by the user device.

FIG. 1 illustrates the system 100 being configured with a first virtual assistant, a second virtual assistant, and a third virtual assistant. However, this is not to be limiting, as the scope of the present disclosure relates to the system 100 including any two or more assistants. The three assistant-configuration of the system 100 is merely provided to illustrate the three different configurations of assistants that may be implemented by the system 100, and their corresponding configuration data.

In some embodiments, the user device 110 may store configuration data for all assistants of the system 100. In other embodiments, the user device 110 may store configuration data for a portion of the virtual assistants of the system 100.

Figure 12:
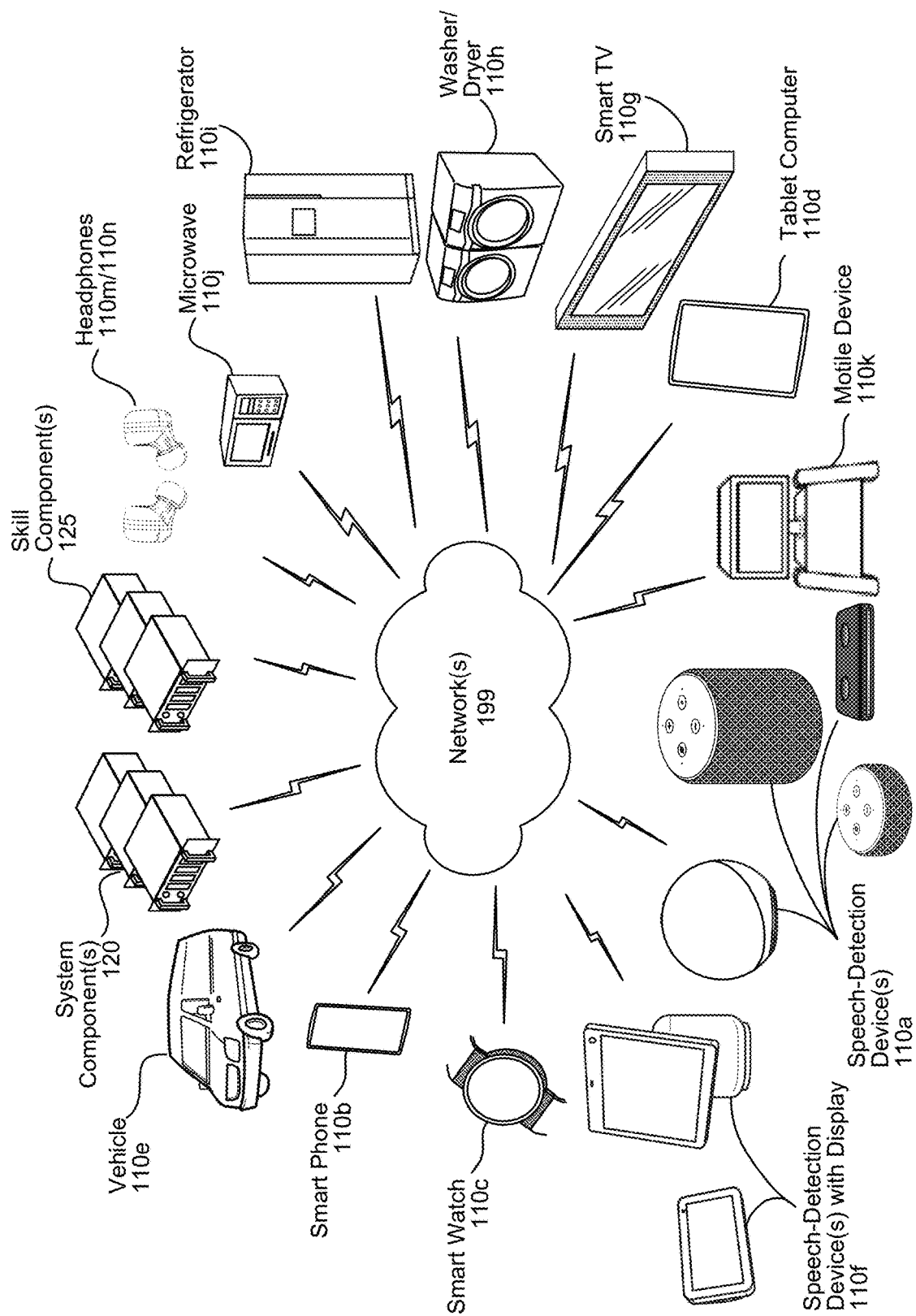
FIG. 12 illustrates an example of a computer network for use with the overall system, according to embodiments of the present disclosure.

Different user devices may be configured to implement or communicate with one or more different assistants. In some embodiments, the user device 110 may store assistant configuration data based on the user device 110 corresponding to a particular device type and/or being produced by a particular manufacturer. The user device 110 may store assistant configuration data at the Original Equipment Manufacturer (OEM) level. For example, a first user device 110a may store assistant configuration data for a first grouping of two or more assistants based on the first user device 110a corresponding to a first device type and/or being produced by a first manufacturer, and a second user device 110b may store assistant configuration data for a second grouping of two or more assistants based on the second user device 110b corresponding to a second device type and/or being produced by a second manufacturer (referring to user devices as shown in FIG. 12). The first grouping of two or more assistants may be entirely different from the second grouping of two more assistants, or the first grouping of two or more assistants may have at least one assistant in common with the second grouping of two or more assistants. Any configuration and combination of virtual assistants can be supported including updates and changes to the virtual assistants available at a user device 110.

Referring to FIG. 1, as shown in this example configuration, the first virtual assistant is wholly implemented by the user device 110. That is, the first virtual assistant includes at least a first virtual assistant component 140a implemented by the user device 110, but does not have a corresponding assistant component(s) 113. Accordingly, the configuration data, of the first virtual assistant as stored in the virtual assistant configuration storage 117, may include a virtual assistant identifier of the first virtual assistant, a virtual assistant name of the first virtual assistant, and a resource identifier of the first virtual assistant component 140a.

In contrast to the first virtual assistant, the second virtual assistant is wholly implemented by the second virtual assistant component(s) 113a separate from but in communication with the user device 110 via one or more networks. That is, the second virtual assistant does not include at least one component implemented by the user device 110. Accordingly, the configuration data, of the second virtual assistant as stored in the virtual assistant configuration storage 117, may include a virtual assistant identifier of the second virtual assistant, a virtual assistant name of the second virtual assistant, and a resource identifier of the second virtual assistant component(s) 113a.

In contrast to the first and second virtual assistants, the third virtual assistant is partially implemented by the user device 110, and partially implemented by the third virtual assistant component(s) 113b separate from but in communication with the user device 110 via one or more networks. That is, the third virtual assistant includes at least a third virtual assistant component 140b implemented by the user device 110, and the third virtual assistant component(s) 113b. Accordingly, the configuration data, of the third virtual assistant as stored in the virtual assistant configuration storage 117, may include a virtual assistant identifier of the third virtual assistant, a virtual assistant name of the third virtual assistant, a resource identifier of the third virtual assistant component 140b, and a resource identifier of the third virtual assistant component(s) 113b.

In situations where a virtual assistant is partially implemented as a virtual assistant component 140 and partially implemented by a virtual assistant component(s) 113, the virtual assistant component(s) 113 may communicate directly with the multi-assistant component 115. In other situations where a virtual assistant is partially implemented as a virtual assistant component 140 and partially implemented by a virtual assistant component(s) 113, the virtual assistant component(s) 113 may communicate indirectly with the multi-assistant component 115 via the assistant component 140.

The user device 110 may receive a user input to be processed by a particular assistant. The user input may take various forms. For example, the user device 110 may receive audio of a spoken natural language user input (e.g., an utterance). As another example, the user device 110 may receive text of a typed natural language user input. For further example, the user device 110 may receive an image of a user input in the form of a gesture (e.g., particular hand movement). As another example, a user input may be operation of a button (e.g., a user performing a press, or press and hold, operation of a physical button of the user device 110 or a virtual button presented on a display of the user device 110).

After receiving the user input, the user device 110 may determine a virtual assistant, represented in the virtual assistant configuration storage 117, that is to process the user input. The user device 110 may make this determination based on various context data. In some embodiments, the user device 110 may make this determination based on the user input including the virtual assistant name of a particular assistant. For example, the user input may be a spoken user input that uses the virtual assistant name as a wakeword. Wakeword processing is described herein below with respect to FIG. 8. In some embodiments, the user device 110 may make this determination based on the user input corresponding to operation of a physical button associated with a particular virtual assistant (e.g., in push-to-talk situation).

In some embodiments, the multi-assistant component 115 may be configured to determine the virtual assistant that is to process a present user input. In other embodiments, the user device 110 may include an "assistant selection" component that is implemented separate from the multi-assistant component 115, but which may send, to the multi-assistant component 115, data indicating the virtual assistant that is to process with respect to the present user input. For example, the data indicating the virtual assistant may be the virtual assistant name of the virtual assistant.

Upon the user device 110 determining the virtual assistant that is to process, the multi-assistant component 115 may identify the configuration data, of the determined assistant, in the virtual assistant configuration storage 117. For example, the multi-assistant component 115 may query the virtual assistant configuration storage 117 for configuration data associated with the virtual assistant name or virtual assistant identifier of the virtual assistant that is to process the user input.

Upon receiving the configuration data of the virtual assistant that is to process the user input, the multi-assistant component 115 may determine the resource identifier(s) that are included in the configuration data, and send the user input data to the assistant components identified by the resource identifier(s). For example, if the configuration data received is that of the first virtual assistant, the multi-assistant component 115 may send the user input data to the first virtual assistant component 140a corresponding to the resource identifier in the first virtual assistant's configuration data. As another example, if the configuration data received is that of the second virtual assistant, the multi-assistant component 115 may send the user input data to the second virtual assistant component(s) 113a corresponding to the resource identifier in the second virtual assistant's configuration data. For further example, if the configuration data received is that of the third virtual assistant, the multi-assistant component 115 may send the user input data to the third virtual assistant component 140b, corresponding to the component resource identifier in the third virtual assistant's configuration data, and/or the third virtual assistant component(s) 113b corresponding to the third component(s) resource identifier in the third virtual assistant's configuration data. Policies or similar data in the configuration data can be utilized to determine which component to handle the input when there are multiple options.

With respect to a virtual assistant that is partially implemented by the user device 110 and partially implemented by a component(s) separate from but in communication with the user device 110 via one or more networks, in some embodiments the component(s), of the virtual assistant as implemented by the user device 110, may perform the same type of processing as the component(s) of the virtual assistant that is implemented separate from but in communication with the user device 110. For example, both the component (implemented by the user device 110) and the component(s) (in communication with the user device 110) may perform ASR and NLU processing of user inputs, but the component (implemented by the user device 110) may be configured to perform ASR and NLU processing of a subset of the user inputs that are capable of being processed using the component(s) in communication with the user device 110.

Alternatively, the component(s) may be configured to perform ASR and NLU processing of one or more user inputs whose response is executed locally by the user device 110 (e.g., when the user device 110 is a vehicle, the component(s) may be configured to perform ASR and NLU processing of the user inputs "turn up the volume of the radio," "roll down the driver window," "change the cabin temperature to 68," etc.), whereas the virtual assistant's component(s) may be configured to perform ASR and NLU processing of one or more user inputs whose execution is not so device centric (e.g., user inputs such as "what is the weather," "how is the traffic to work today," "what is my morning news briefing," etc.). In such embodiments, the multi-assistant component 115 may send the user input data to the virtual assistant component (implemented by the user device 110) and the virtual assistant component(s) (in communication with the user device 110). Using the third virtual assistant of FIG. 1 as an example, the multi-assistant component 115 may send the user input data to the third virtual assistant component 140*b* and the third virtual assistant component(s) 113*b*, resulting in the third virtual assistant component 140*b* and the third virtual assistant component(s) 113*b* each processing the user input to attempt to determine a response thereto.

In some embodiments, when a virtual assistant is partially implemented by the user device 110 and partially implemented by a virtual assistant component(s) separate from but in communication with the user device 110 via one or more networks, the virtual assistant component(s), implemented by the user device 110, may perform one or more different types of processing than the virtual assistant component(s) in communication with the user device 110. For example, the virtual assistant component, implemented by the user device 110, may be configured to perform "less resource intensive" processing than the virtual assistant component(s) in communication with the user device 110. For example, the virtual assistant component, implemented by the user device 110, may be configured to perform ASR processing, whereas the virtual assistant component(s), in communication with the user device 110, may be configured to perform NLU processing. Continuing this example and with respect to the third virtual assistant of FIG. 1, the multi-assistant component 115 may send the user input data (i.e., audio data of a spoken natural language user input) to the third virtual assistant component 140*b*, but not the third virtual assistant component(s) 113*b*. In some embodiments, the virtual assistant component(s), in communication with the user device 110, may be configured to perform ASR and NLU processing, whereas the virtual assistant component, implemented by the user device 110, may be configured to perform other processing with respect to a user input. Continuing this example and with respect to the third virtual assistant of FIG. 1, the multi-assistant component 115 may send the user input data to the third virtual assistant component(s) 113*b*, but not the third virtual assistant component 140*b*. It is noted that the foregoing selective sending of data to components of a virtual assistant is illustrative, and that other configurations, of a virtual assistant's components, and the corresponding selective sending of data to same, are within the scope of the present disclosure.

FIG. 1 illustrates the second virtual assistant component(s) 113*a* and the third virtual assistant component(s) 113*b* as including the same types of components for processing user inputs. However, the present disclosure is not limited thereto. The present disclosure is also intended to cover embodiments in which the virtual assistant component(s) 113 of one virtual assistant includes at least one type of component not implemented by the virtual assistant component(s) 113 of another virtual assistant. Moreover, it is noted that when the virtual assistant component(s) 113 of two different assistants include the same type of component (e.g., each include an ASR component), that the same-type components of the virtual assistants may perform the same or different processing (e.g., the ASR component, of a virtual assistant component(s) 113 of a first virtual assistant, may be configured to process the same or at least one different user input than the ASR component of a virtual assistant component(s) 113 of a second virtual assistant).

With respect to the example of FIG. 1, the second virtual assistant component(s) 113*a* and/or the third virtual assistant component(s) 113*b* may include a user input processing component 192, such as the user input processing component 192*a* in the second virtual assistant component(s) 113*a*, and the user input processing component 192*b* in the third virtual assistant component(s) 113*b*. The user input processing component 192 may be configured to perform operations related to understanding user inputs. For example, the user input processing component 192 may be configured to perform ASR and NLU processing with respect to spoken natural language user input, NLU processing with respect to text natural language user inputs, gesture detection processing with respect to a user input gesture, processing to determine the selection of a button corresponds to a particular command, etc. Input processing component 192 may operate similarly to language processing components 892/992 discussed below.

The second virtual assistant component(s) 113*a* and/or the third virtual assistant component(s) 113*b* may include an output component 193, such as the output component 193*a* in the second virtual assistant component(s) 113*a*, and the output component 193*b* in the third virtual assistant component(s) 113*b*. The output component 193 may be configured to perform operations to generate an output, responsive to a user input, and configured for present to the user, such as the operations discussed below in reference to language output components 893/993. For example, the output component 193 may be configured to perform NLG processing to generate a natural language output, which may be displayed to the user. For further example, the output component 193 may be configured to perform TTS processing (e.g., using the output of NLG processing) to generate synthesized speech for output to the user as audio.

The second virtual assistant component(s) 113*a* and/or the third virtual assistant component(s) 113*b* may include one or more skill components 190, such as the skill component(s) 190*a* in the second virtual assistant component(s) 113*a*, and the skill component(s) 190*b* in the third virtual assistant component(s) 113*b*. The one or more skill components 190 may perform various operations related to determining responses to user inputs. For example, a weather skill component may be configured to determine weather information in response to the user input "what is today's weather." For further example, a shopping skill component may be configured to perform a transaction in response to the user input "purchase one gallon of milk." As another example, a music skill component may be configured to identify a song's audio file in response to the user input "play my workout playlist." For further example, a smart home skill component may be configured to cause a door lock to be in a locked state in response to the user input "lock my front door." The one or more skill components 190 may take as input the output from the user input processing component 192, and the output of the one or more skill components 190 may be input to the output component 193.

Figure 2:
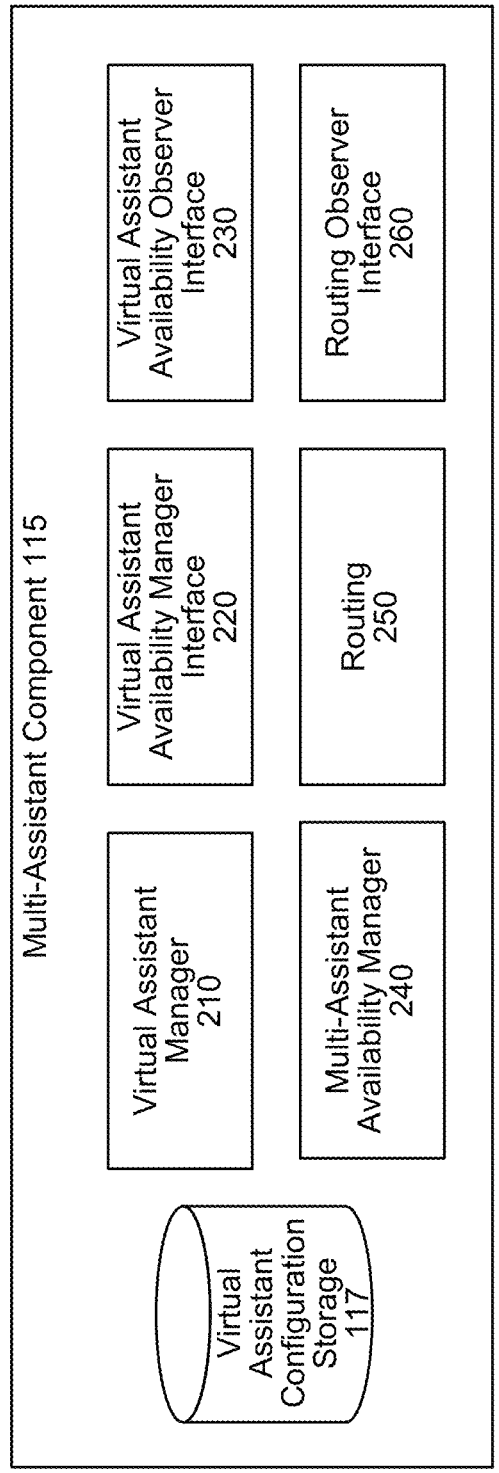
FIG. 2 is a conceptual diagram of example components of a multi-assistant component of a user device, according to embodiments of the present disclosure.

FIG. 2 illustrates example components of the multi-assistant component 115. The multi-assistant component 115 may include the virtual assistant configuration storage 117, as illustrated in FIG. 1.

The multi-assistant component 115 may include a virtual assistant manager component 210 that functions as the source of truth for all assistant-related information for all assistants implemented by or in communication with (e.g., via one or more networks) the user device 110. In some embodiments, the virtual assistant manager component 210 may function as the source of truth for all assistant-related information for all assistants of the system 100. The virtual assistant manager component 210 may store or manage information such as assistant identifiers, assistant names, resource identifiers of assistant components and/or devices, information indicating whether a virtual assistant is enabled for the user device 110, information indicating whether a virtual assistant is enabled for a user device type, and/or information indicating whether a virtual assistant is enabled for a particular user.

In some embodiments, the virtual assistant manager component 210 may store information in the virtual assistant configuration storage 117, and thus the virtual assistant configuration storage 117 may store the information detailed in the preceding paragraph. For example, the virtual assistant configuration storage 117 may store configuration data, for a virtual assistant, including a virtual assistant identifier of the virtual assistant, a virtual assistant name of the virtual assistant, one or more resource identifiers corresponding to one or more components and/or devices of the virtual assistant, data (e.g., a Boolean value) indicating whether the virtual assistant is enabled for the user device 110, data (e.g., a Boolean value) indicating whether the virtual assistant is enabled for a particular user device type (e.g., a device type corresponding to the user device 110), and/or data (e.g., a Boolean value) associated with a user identifier and indicating whether the virtual assistant is enabled for the user corresponding to the user identifier, as well as, in some cases, other data used for determining the virtual assistant that is to handle user input including policies, permissions, capabilities, and similar data.

The multi-assistant component 115 may include a virtual assistant availability manager interface component 220 that is used to manage assistant availability-related information. For example, the virtual assistant availability manager interface component 220 may be used to add a new resource identifier for a virtual assistant, and update a virtual assistant's resource identifier. To enable this functionality, the virtual assistant availability manager interface component 220 may have a configure assistant function (e.g., configureAssistant( )) that accepts a virtual assistant identifier, a virtual assistant name, and a resource identifier.

The virtual assistant manager component 210 may be configured as an observer for receiving updates for one or more assistants, and the virtual assistant manager component 210 may receive notification data when the configure assistant function, of the virtual assistant availability manager interface component 220, is used regarding a virtual assistant with respect to which the virtual assistant manager component 210 is an observer.

The configure assistant function, of the virtual assistant availability manager interface component 220, may be used to configure the virtual assistant to be implemented by the user device 110, by a component(s) (e.g., the second virtual assistant component(s) 113a or the third virtual assistant component(s) 113b illustrated in FIG. 1) separate from by in communication with the user device 110 via one or more networks, or implemented partially by the user device 110 and partially by a component(s) implemented separate from by in communication with the user device 110. For example, if the virtual assistant configuration storage 117 stores assistant configuration data not including any resource identifiers, and the configure assistant function is used to provide a virtual assistant identifier and/or name, and a resource identifier of a virtual assistant component implemented by the user device 110, the virtual assistant manager component 210 may receive notification data indicating the virtual assistant identifier and/or name, and the resource identifier, and may update the configuration data (i.e., including the provided assistant identifier and/or name) to include the provided resource identifier, thereby causing the virtual assistant to be implemented solely by the user device 110. As another example, if the virtual assistant configuration storage 117 stores assistant configuration data not including any resource identifiers, and the configure assistant function is used to provide a virtual assistant identifier and/or name, and a resource identifier of a virtual assistant component(s) implemented separate from but in communication with the user device 110, the virtual assistant manager component 210 may receive notification data indicating the configure assistant function was used to provide the virtual assistant identifier and/or name, and the resource identifier, and may update the configuration data (i.e., including the provided assistant identifier and/or name) to include the provided resource identifier, thereby causing the virtual assistant to be implemented solely by the component(s) implemented separate from by in communication with the user device 110. For further example, if the virtual assistant configuration storage 117 stores assistant configuration data including a resource identifier for a virtual assistant component implemented by the user device 110, and the configure assistant function is used to provide a virtual assistant identifier and/or name, and a resource identifier of a virtual assistant component(s) implemented separate from but in communication with the user device 110, the virtual assistant manager component 210 may receive notification data indicating the configure assistant function was used to provide the virtual assistant identifier and/or name, and the resource identifier, and may update the configuration data (i.e., including the provided assistant identifier and/or name) to include the provided resource identifier, thereby causing the virtual assistant to be implemented partially by the user device 110 and partially by the component(s) in communication with the user device 110. As another example, if the virtual assistant configuration storage 117 stores assistant configuration data including a resource identifier for a virtual assistant component(s) implemented separate from by in communication with the user device 110, and the configure assistant function is used to provide a virtual assistant identifier and/or name, and a resource identifier of a virtual assistant component implemented by the user device 110, the virtual assistant manager component 210 may receive notification data indicating the configure assistant function was used to provide the virtual assistant identifier and/or name, and the resource identifier, and may update the configuration data (i.e., including the provided assistant identifier and/or name) to include the provided resource identifier, thereby causing the virtual assistant to be implemented partially by the user device 110 and partially by the component(s) in communication with the user device 110. For further example, if the virtual assistant configuration storage 117 stores assistant configuration data not including any resource identifiers, and the configure assistant function is used to provide a virtual assistant identifier and/or name, and a resource identifier of a virtual assistant component and a resource identifier of a virtual assistant component(s) in communication with the user device 110, the virtual assistant manager component 210 may receive notification data indicating the configure assistant function was used to provide the virtual assistant identifier and/or name, and the resource identifiers, and may update the configuration data (i.e., including the provided assistant identifier and/or name) to include the provided resource identifiers, thereby causing the virtual assistant to be implemented partially by the user device 110 and partially by the component(s) in communication with the user device 110.

The configure assistant function may also permit a virtual assistant's name to be updated at runtime. For example, if the virtual assistant configuration storage 117 stores assistant configuration data not including a virtual assistant name, and the configure assistant function is used to provide a virtual assistant identifier and a virtual assistant name, the virtual assistant manager component 210 may receive notification data indicating the configure assistant function was used to provide the virtual assistant identifier and the virtual assistant name, and may update the configuration data (i.e., including the provided assistant identifier) to include the provided assistant name. As another example, if the virtual assistant configuration storage 117 stores assistant configuration data including a first virtual assistant name, and the configure assistant function is used to provide a virtual assistant identifier and a second virtual assistant name, the virtual assistant manager component 210 may receive notification data indicating the configure assistant function was used to provide the virtual assistant identifier and the second virtual assistant name, and may update the configuration data (i.e., including the provided assistant identifier) to replace the first virtual assistant name with the second virtual assistant name.

The virtual assistant availability manager interface component 220 may additionally include a remove assistant function (e.g., removeAssistant( )) that is usable to remove a virtual assistant's configuration data. For example, if the virtual assistant configuration storage 117 stores assistant configuration data including a virtual assistant identifier, and the remove assistant function is used to provide a virtual assistant identifier, the virtual assistant manager component 210 may receive notification data indicating the remove assistant function was used to provide the virtual assistant identifier and, based thereon, may cause the configuration data (i.e., including the virtual assistant identifier) to be deleted from the virtual assistant configuration storage 117. As another example, if the virtual assistant configuration storage 117 stores assistant configuration data including a virtual assistant identifier, and the remove assistant function is used to provide a virtual assistant identifier, the virtual assistant manager component 210 may receive notification data indicating the remove assistant function was used to provide the virtual assistant identifier and, based thereon, may cause the configuration data (i.e., including the virtual assistant identifier) to include a Boolean value indicating the virtual assistant is disabled.

The multi-assistant component 115 may include a virtual assistant availability observer interface component 230 that communicates with a storage component configured to store a mapping (i.e., one or more associations) between a virtual assistant identifier and one or more availability observers that are to receive notification data regarding changes to the virtual assistant's configuration data and/or changes to the virtual assistant's availability status. As used herein, an "availability observer" refers to a component, a device, or a system that is to receive notification data regarding changes to a virtual assistant's configuration data and/or changes to a virtual assistant's availability status. In some embodiments, an availability observer may be a component, a device, or a system configured to send data to and/or receive data output from a virtual assistant.

A virtual assistant may have an availability status of "available," "partially available," or "unavailable." The "available" status means all components of the virtual assistant are presently capable of processing. The "partially available" status means at least one component of the virtual assistant is presently incapable of processing (e.g., due to processing load, lost network connection, etc.). The "unavailable" status means all components of the virtual assistant are presently incapable of processing (e.g., due to processing load, lost network connection, etc.).

The virtual assistant availability observer interface component 230 may implement an add observer function (e.g., addObserver( )) that allows for an availability observer to be added for a virtual assistant. For example, the add observer function may be used to provide a connection observer identifier (i.e., an identifier of a component, a device, or a system) and a virtual assistant identifier. In response thereto, the virtual assistant availability observer interface component 230 may associate the provided availability observer identifier with the provided assistant identifier, thereby enabling sending, to the availability observer corresponding to the provided availability observer identifier, of notifications regarding changes to the configuration data and/or availability status of the virtual assistant corresponding to the virtual assistant identifier.

The virtual assistant availability observer interface component 230 may implement a remover observer function (e.g., removeObserver( )) that allows for an availability observer to be removed for a virtual assistant. For example, the remove observer function may be used to provide an availability observer identifier and a virtual assistant identifier. In response thereto, the virtual assistant availability observer interface component 230 may delete the associated availability observer identifier and assistant identifier from storage, thereby preventing further sending, to the availability observer corresponding to the provided availability observer identifier, of notifications regarding changes to the configuration data and/or availability status of the virtual assistant corresponding to the virtual assistant identifier.

In some situations, the remove observer function may be used to provide a virtual assistant identifier without also providing an availability observer identifier. In response thereto, the virtual assistant availability observer interface component 230 may delete all availability observer identifiers associated with the virtual assistant identifier from storage, thereby preventing further sending, to the availability observers corresponding to the availability observer identifiers, of notifications regarding changes to the configuration data and/or availability status of the virtual assistant corresponding to the virtual assistant identifier.

The multi-assistant component 115 may include a multi-assistant availability manager component 240. The multi-assistant availability manager component 240 is configured to store associations between assistant identifiers and one or more corresponding resource identifiers, as well as associations between assistant identifiers and one or more corresponding availability observer identifiers. The multi-assistant availability manager component 240 may store a map of assistant identifiers to one or more corresponding resource identifiers and/or a reverse map of resource identifiers to corresponding assistant identifiers. Thus, the multi-assistant availability manager component 240 may be configured to coordinate the sending of data to assistant components and devices, as well as availability observers.

The multi-assistant component 115 may include a routing component 250 configured to send data to the components and devices of assistants of the system 100. At runtime, the routing component 250 may receive a send message request (e.g., as a send message function of the routing component 250) intended to be sent to a virtual assistant's component(s) implemented separate from but in communication with the user device 110 via one or more networks. The send message request may include a message request object and event data. The message request object includes a virtual assistant identifier, and optionally a resource identifier of the virtual assistant's component(s) in communication with the user device 110. The event data may be any data that is to be processed by the virtual assistant's component(s). In some embodiments, the event data may be formulated in an open standard format that uses human-readable text. An example of such is JAVASCRIPT Object Notation (JSON).

In some situations, the routing component 250 may receive a message request object including a virtual assistant identifier but not a resource identifier. In such situations, the routing component 250 may use a send message function, of the multi-assistant availability manager component 240, to obtain a virtual assistant component(s) resource identifier associated with the virtual assistant identifier included in the message request object. In the event that the multi-assistant availability manager component 240 is not presently storing an association between the virtual assistant identifier and a component(s) resource identifier, the multi-assistant availability manager component 240 may send, to the routing component 250, data indicating the foregoing lack of association, and, based thereon, the routing component 250 may cease processing with respect to the send message request.

Alternatively, in response to receiving the data indicating there is presently no stored association between the virtual assistant identifier and a virtual assistant component(s) resource identifier, the routing component 250 may use the send message function, of the multi-assistant availability manager component 240, to obtain a virtual assistant component resource identifier associated with the virtual assistant identifier included in the message request object. In response to the multi-assistant availability manager component 240 returning a virtual assistant component resource identifier in response to the send message function, the routing component 250 may send message data to the virtual assistant component corresponding to the virtual assistant component resource identifier. The message data may include at least the event data of the send message request.

The routing component 250 may cause (e.g., using a receive function of the multi-assistant availability manager component 240) the multi-assistant availability manager component 240 to verify a virtual assistant identifier included in a send message request. When a send message request includes a message request object including a virtual assistant identifier and a resource identifier, the routing component 250 may provide the resource identifier to the multi-assistant availability manager component 240 (e.g., via the receive function). If the multi-assistant availability manager component 240 determines it is presently storing a virtual assistant identifier associated with the provided resource identifier, the multi-assistant availability manager component 240 may send the determined assistant identifier to the routing component 250. The routing component 250 may then determine whether the virtual assistant identifier, included in the message request object, is the same as the message identifier as received from the multi-assistant availability manager component 240. If the virtual assistant identifiers match, the multi-assistant availability component may send message data, including at least the event data of the send message request, to the virtual assistant component(s) corresponding to the resource identifier included in the in the message request object of the send message request. Conversely, if the virtual assistant identifiers do not match (i.e., the virtual assistant identifier in the send message request is incorrect), then the routing component 250 may cease processing with respect to the send message request.

In some embodiments, the virtual assistant configuration storage 117 may store configuration data for one or more assistants at the time the user device 110 is manufactured. At the time of manufacture, a virtual assistant's stored configuration data may include a virtual assistant identifier and optionally a virtual assistant name, but not include any resource identifiers of assistant components and/or devices. At start up (e.g., when the user device 110 is powered on and the multi-assistant component 115 is initialized), the routing component 250 may receive all configuration data presently stored in the virtual assistant configuration storage 117. In some embodiments, all the configuration data may be provided to the routing component 250 as a single JSON file. At start up, a virtual assistant's configuration data may not include any resource identifiers. The resource identifier(s), for a virtual assistant, may be provided sometime after startup.

The multi-assistant component 115 may include a routing observer interface 260 that stores a mapping (i.e., one or more associations) between a virtual assistant identifier and one or more routing observers that are to receive notification data regarding the sending of message data and/or directive data to assistant components and devices. As used herein, a "routing observer" refers to a component, a device, or a system that is to receive notification data regarding the sending of message data and/or directive data to assistant components and devices. In some embodiments, a routing observer may be a component, a device, or a system configured to send data to a virtual assistant.

The routing observer interface 260 may implement an add observer function that allows for a routing observer to be added for a virtual assistant. For example, the add observer function may be used to provide a routing observer identifier (i.e., an identifier of a component, a device, or a system) and a virtual assistant identifier. In response thereto, the routing observer interface 260 may associate the provided routing observer identifier with the provided assistant identifier, thereby enabling sending, to the routing observer corresponding to the provided availability observer identifier, of notifications regarding the sending of message data and/or directive data to the component(s) of the virtual assistant corresponding to the provided assistant identifier.

The routing observer interface 260 may implement a remove observer function that allows for a routing observer to be removed for a virtual assistant. For example, the remove observer function may be used to provide a routing observer identifier and a virtual assistant identifier. In response thereto, the routing observer interface 260 may delete the associated routing observer identifier and assistant identifier from storage, thereby preventing further sending, to the routing observer corresponding to the provided availability observer identifier, of notifications regarding the sending of message data and/or directive data to component(s) of the virtual assistant corresponding to the virtual assistant identifier.

In some situations, the remove observer function may be used to provide a virtual assistant identifier without also providing a routing observer identifier. In response thereto, the routing observer interface 260 may delete all routing observer identifiers associated with the virtual assistant identifier from storage, thereby preventing further sending, to the routing observers corresponding to the availability observer identifiers, of notifications regarding the sending of message data and/or directive data to the component(s) of the virtual assistant corresponding to the virtual assistant identifier.

FIGS. 3A and 3B illustrate how a virtual assistant, implemented by a virtual assistant component(s) 113 (e.g., the second virtual assistant component(s) 113a or the third virtual assistant component(s) 113b illustrated in FIG. 1), may be configured, as well as how a message may be routed to the virtual assistant component(s) 113.

As illustrated in FIG. 3A, a routing client 305 may send (step 302), to the multi-assistant component 115, a request to enable a virtual assistant implemented by a virtual assistant component(s) 113 in communication with the user device 110. The request may include an assistant identifier, and optionally an assistant name, for the virtual assistant to be enabled. In some embodiments, the request may be received in response to a user input requesting the virtual assistant be enabled. For example, a display may be used to present a list of virtual assistants that can be enabled, and the user may provide a user input (e.g., spoken natural language input, touchscreen interaction, etc.) indicating a virtual assistant from the list to be enabled.

In some embodiments, the user device 110 may be configured to communicate with the virtual assistant component(s) 113 when the user device 110 is manufactured. In such embodiments, the routing client 305 may be configured to send the request (at step 302) upon the user device 110 being powered on (e.g., at start up). In such embodiments, the routing client 305 may be configured to send the request (at step 302) for each virtual assistant the user device 110 is configured to communicate with via a virtual assistant component(s) 113.

In response to the request, the multi-assistant component 115 may generate and store (step 304) configuration data for the virtual assistant, where the configuration data may include the virtual assistant identifier and optionally the virtual assistant name. Since, at this point, the configuration data does not include any resource identifiers, the virtual assistant may be considered "disabled," meaning the virtual assistant is incapable of processing message data.

After the configuration data is generated and stored, the routing client 305 may send (step 306), to the multi-assistant component 115 (e.g., using a configure assistant function of the multi-assistant component 115), a resource identifier of the virtual assistant component(s) 113.

In response to receiving the resource identifier of the virtual assistant component(s) 113, the multi-assistant component 115 may update (step 308) the configuration data, for the virtual assistant (e.g., generate second configuration data for the virtual assistant), where the updated configuration data includes the virtual assistant identifier and optionally name, as well as the resource identifier of the virtual assistant component(s) 113. Since, at this point, the configuration data includes a resource identifier, the virtual assistant may be considered "enabled," meaning the virtual assistant is permitted to process (e.g., message) data received from the user device 110.

After generating the updated configuration data, the routing client 305 may send (step 310), to the multi-assistant component 115 (e.g., using a send message function of the multi-assistant component 115, and more particularly the routing component 250 of the multi-assistant component 115), a message request object, including a virtual assistant identifier, and event data. In this context, the routing client 305 may be any component, device, or system that is a client of the multi-assistant component 115 and which is configured to send event data intended for a virtual assistant of the system 100.

Using the updated configuration data, the multi-assistant component 115, and more particularly the routing component 250 thereof, may determine (step 312) the resource identifier, of the virtual assistant component(s) 113, that is associated with the virtual assistant identifier as represented in the message request object. This can be a lookup of the resource identifier using the virtual assistant identifier. Where there are multiple resource identifiers, the enablement setting, policies, and/or capabilities associated with each resource identifier can be matched to determine the resource identifier.

The multi-assistant component 115, and more particularly the routing component 250 thereof, may generate (step 314) message data including at least the event data received at step 310.

The multi-assistant component 115, and more particularly the routing component 250 thereof, may send (step 316) the message data to the virtual assistant component(s) 113 based on the updated configuration data including the resource identifier, of the virtual assistant component(s) 113, as being associated with the virtual assistant identifier as provided in the message request object.

The virtual assistant component(s) 113 may process (step 318) the message data to determine directive data, and the virtual assistant component(s) 113 may send (step 320) the directive data to the multi-assistant component 115, and more particularly the routing component 250 thereof. In this context, "directive data" refers to any data generated based on processing of the message data, and which is intended to be sent to the routing client 305 that provided the message request object and event data at step 310.

After receiving the directive data, the multi-assistant component 115 may generate (step 322) directive data tagged with the virtual assistant identifier corresponding to the virtual assistant component(s) 113. In some embodiments, the directive data may be tagged with the virtual assistant identifier when the directive data is received from the virtual assistant component(s) 113. In embodiments where the directive data is not tagged with the virtual assistant identifier when the directive data is received from the virtual assistant component(s) 113, the multi-assistant component 115 may determine the resource identifier, of the virtual assistant component(s) 113 from which the directive data was received, is associated with the virtual assistant identifier in the updated configuration data, and based thereon may tag the determined virtual assistant identifier to the directive data received at step 320.

Thereafter, the multi-assistant component 115, and more particularly the routing component 250, may send (step 324), to the routing client 305 (i.e., the source of the message request object and the event data received at step 310), the directive data tagged with the virtual assistant identifier.

FIGS. 4A and 4B illustrate how a virtual assistant, implemented by the user device 110, may be configured, as well as how a message may be routed to a virtual assistant component 140 implemented by the user device 110.

As illustrated in FIG. 4A, a routing client 305 may send (step 402) to the multi-assistant component 115, a request to enable a virtual assistant implemented by the user device 110. The request may include an assistant identifier, and optionally an assistant name, for the virtual assistant to be enabled. In some embodiments, the request may be received in response to a user input requesting the virtual assistant be enabled. For example, a display may be used to present a list of virtual assistants that can be enabled, and the user may provide a user input (e.g., spoken natural language input, touchscreen interaction, etc.) indicating a virtual assistant from the list to be enabled.

In some embodiments, the user device 110 may be configured to implement the virtual assistant when the user device 110 is manufactured, e.g., including some or all of the software for implementing the virtual assistant. In other embodiments, the primary software components of the virtual assistant are not present on the user device and must be installed. In some embodiments, the routing client 305 may be configured to send the request (at step 402) upon the user device 110 being powered on (e.g., at start up). In such embodiments, the routing client 305 may be configured to send the request (at step 402) for each virtual assistant the user device 110 is configured to implement.

In response to receiving the request, the multi-assistant component 115 may store (step 404) configuration data for the virtual assistant, where the configuration data includes the virtual assistant identifier of the virtual assistant and the resource identifier of the virtual assistant component 140 of the virtual assistant, optionally the virtual assistant name of the virtual assistant. In some embodiments, other configuration data is provided that details the capabilities and operation of the virtual assistant. Each virtual assistant can have a separate configuration structure or manifest that is used to synchronize the operation of the respective virtual assistant between the user device and the remote virtual assistant components and in some cases across multiple user devices.

Moreover, in response to receiving the request at step 402, the multi-assistant component 115 may send (step 406), to a virtual assistant component(s) 113 corresponding to the virtual assistant to be enabled, a request for processing data for the virtual assistant. The request may include the virtual assistant identifier of the virtual assistant, and optionally the virtual assistant name of the virtual assistant.

Thereafter, the multi-assistant component 115 may receive (step 408), from the virtual assistant component(s) 113, processing data for the virtual assistant. The processing data may be any data usable by a component of the user device 110 to perform processing as the virtual assistant. For example, the processing data may include a trained machine learning model for detecting a wakeword corresponding to the virtual assistant. As another example, the processing data may include a trained machine learning model for performing ASR processing with respect to spoken natural language user inputs capable of being processed by the virtual assistant. For further example, the processing data may include a trained machine learning model for performing NLU processing with respect to natural language user input capable of being processed by the virtual assistant.

In some embodiments, the processing data may include a flag indicating whether installation of virtual assistant specific models or other data is presently required or has been completed.

In some embodiments, the processing data may include data indicating the locales for which the virtual assistant is enabled, where a locale indicates any one or more of a geographic region, a language, a language subgroup (e.g., a dialect). Where a given locale is enabled, associated supporting components are installed (e.g., where an Irish local is enabled, wakeword and ASR models that recognize Irish English dialects are installed and enabled) for voice and/or graphical user interfaces. Some wakewords can be organized and enabled by locale.

In some embodiments, the processing data may include audio data that may be installed on the user device 110 to service user inputs to the virtual assistant while the virtual assistant is not available. For example, the audio data may include the synthesized speech "I'm sorry, I'm having trouble connecting right now." The processing data can further specify other assets including graphics, sound effects, and similar content that is utilized at the user device to indicate the operation of the virtual assistant and differentiate its operation from that of other virtual assistants.

In some embodiments, the processing data may indicate whether or not the virtual assistant is permitted to generate and output including explicit language.

In some embodiments, the configuration data can specify further settings including bespoke settings which may pertain to the virtual assistant's behavior. In some embodiments, each setting may comprise of the following elements: {id, Name, valueType, bool Value, intValue, stringValue}.

The multi-assistant component 115 can map these expressions of a setting to a generic synchronization protocol between the user device and the remote virtual assistant components, where these settings pertain to virtual assistant operation, rather than device behavior (e.g., "explicit language" being an example where it affects the nature of the TTS delivered by the virtual assistant, requiring no change to device software if changed).

These settings can be accessible to the user via an interactive menu view. The settings, viewed on a user device can be presented in the same manner as on a companion app.

Additional configuration information can include resource locators or address for authenticating the virtual assistant components on the user device 110 with the remote virtual assistant components 113. For example, this can be a URL which should be connected to in order to refresh the authentication token expected by the virtual assistant components 113. The settings can also specify authentication policies.

The configuration data can specify permissioned capabilities of the virtual assistant that can be utilized to verify directives received at the user device. This describes which device capabilities, the virtual assistant is permissioned to use.

The configuration data can be restricted to be accessible to the respective virtual assistant and the local components of that virtual assistant.

The multi-assistant component 115 may cause (step 410) at least one component, of the user device 110, to be configured using the processing data. For example, if the processing data includes a trained machine learning model for detecting a wakeword corresponding to the virtual assistant, the multi-assistant component 115 may cause a wakeword detection component 820 to be configured to implement the trained machine learning model. As another example, if the processing data includes a trained machine learning model for performing ASR processing with respect to spoken natural language user inputs capable of being processed by the virtual assistant, the multi-assistant component 115 may cause the virtual assistant component 140 or an ASR component 950 to be configured to implement the trained machine learning model. For further example, if the processing data includes a trained machine learning model for performing NLU processing with respect to natural language user input capable of being processed by the virtual assistant, the multi-assistant component 115 may cause the virtual assistant component 140 or a component 960 to be configured to implement the trained machine learning model.

After the configuration data is stored and after the at least one component is configured using the processing data, the multi-assistant component 115 may send (step 412) virtual assistant data to a virtual assistant component(s) 113 corresponding to the newly enabled virtual assistant. The purpose of the virtual assistant data is to provide the virtual assistant component(s) 113 with a record of the virtual assistant(s), corresponding to the foregoing virtual assistant component(s) 113, presently enabled and implemented by the user device 110 so that the virtual assistant component(s) 113 can know which messages and/or directives can be sent to the user device 110.

Virtual assistant data may include the configuration data for a virtual assistant.

In some embodiments, in response to the virtual assistant component(s) 113 receiving the virtual assistant data, the virtual assistant component(s) 113 may cause a companion application, installed on the user device 110, to include a graphical user interface configured to present the virtual assistant data (e.g., virtual assistant name). In some embodiments, the virtual assistant component(s) 113 may cause a user device, different from but associated with the user device 110 such as by being represented in the same group profile data, to present the virtual assistant data via a display.

In some embodiments, in response to receiving virtual assistant data from a user device 110, the virtual assistant component(s) 113 may determine another user device associated with the user device 110 (e.g., another user device indicated in a same group profile as the user device 110), and may send the processing data (sent to the user device at step 408) to the other user device such that the virtual assistant becomes enabled at the other user device.

In some embodiments, in response to receiving virtual assistant data, the virtual assistant component(s) 113 may update user profile data and/or device profile data of the user device 110 to include or otherwise represent at least some of the virtual assistant data. This may result in the synchronization of settings of the user device 110 in the virtual assistant component(s) 113.

After the at least one component of the user device 110 is configured using the processing data, and optionally after the virtual assistant data is sent to the virtual assistant component(s) 113, the routing client 305 may send (step 414), to the multi-assistant component 115 (e.g., using a send message function of the multi-assistant component 115), a message request object, including a virtual assistant identifier, and event data. In this context, the routing client 305 may be any component, device, or system that is a client of the multi-assistant component 115 and which is configured to send event data intended for a virtual assistant of the system 100.

Using the configuration data, the multi-assistant component 115, and more particularly the routing component 250 thereof, may determine (step 416) the resource identifier, of the virtual assistant component 140, that is associated with the virtual assistant identifier as represented in the message request object. This can be a lookup of the resource identifier using the virtual assistant identifier. Where there are multiple resource identifiers, the enablement setting, policies, and/or capabilities associated with each resource identifier can be matched to determine the resource identifier.

The multi-assistant component 115, and more particularly the routing component 250 thereof, may generate (step 418) message data including at least the event data received at step 414.

The multi-assistant component 115, and more particularly the routing component 250 thereof, may send (step 420) the message data to the virtual assistant component 140 based on the configuration data including the resource identifier, of the virtual assistant component 140, as being associated with the virtual assistant identifier as provided in the message request object.

The virtual assistant component 140 may process (step 422 illustrated in FIG. 4B) the message data to determine directive data, and the virtual assistant component 140 may send (step 424) the directive data to the multi-assistant component 115, and more particularly the routing component 250 thereof. In this context, "directive data" refers to any data generated based on processing of the message data, and which is intended to be sent to the routing client 305 that provided the message request object and event data at step 414.

After receiving the directive data, the multi-assistant component 115 may generate (step 426) directive data tagged with the virtual assistant identifier corresponding to the virtual assistant component 140. In some embodiments, the directive data may be tagged with the virtual assistant identifier when the directive data is received from the virtual assistant component 140. In embodiments where the directive data is not tagged with the virtual assistant identifier when the directive data is received from the virtual assistant component 140, the multi-assistant component 115 may determine the resource identifier, of the virtual assistant component 140 from which the directive data was received, is associated with the virtual assistant identifier in the configuration data, and based thereon may tag the determined virtual assistant identifier to the directive data received at step 424.

Thereafter, the multi-assistant component 115, and more particularly the routing component 250, may send (step 428), to the routing client 305 (i.e., the source of the message request object and the event data received at step 414), the directive data tagged with the virtual assistant identifier.

FIGS. 5A through 5C illustrate how a virtual assistant, implemented by the user device 110 and a virtual assistant component(s) 113, may be configured, as well as how a message may be routed to a virtual assistant component 140 implemented by the user device 110 and assistant component(s) 113.

As illustrated in FIG. 5A, a routing client 305 may send (step 502) to the multi-assistant component 115, a request to enable a virtual assistant implemented partially by the user device 110 and partially by a virtual assistant component(s) 113. The request may include an assistant identifier, and optionally an assistant name, for the virtual assistant to be enabled, as well as a resource identifier for the virtual assistant component 140 of the virtual assistant, and a resource identifier for the virtual assistant component(s) 113 of the virtual assistant. In some embodiments, the request may be received in response to a user input requesting the virtual assistant be enabled. For example, a display may be used to present a list of virtual assistants that can be enabled, and the user may provide a user input (e.g., spoken natural language input, touchscreen interaction, etc.) indicating a virtual assistant from the list to be enabled.

In some embodiments, the user device 110 may be configured to implement the portion of the virtual assistant when the user device 110 is manufactured. In such embodiments, the routing client 305 may be configured to send the request (at step 502) upon the user device 110 being powered on (e.g., at start up). In such embodiments, the routing client 305 may be configured to send the request (at step 502) for each virtual assistant the user device 110 is configured to implement.

In response to receiving the request, the multi-assistant component 115 may store (step 504) configuration data for the virtual assistant, where the configuration data includes the virtual assistant identifier of the virtual assistant the resource identifier of the virtual assistant component 140 of the virtual assistant, the resource identifier of the virtual assistant component(s) 113 of the virtual assistant, and optionally the virtual assistant name of the virtual assistant.

Moreover, in response to receiving the request at step 502, the multi-assistant component 115 may send (step 506), to the virtual assistant component(s) 113 corresponding to the virtual assistant to be enabled, a request for processing data for the virtual assistant. The request may include the virtual assistant identifier of the virtual assistant, and optionally the virtual assistant name of the virtual assistant.

Thereafter, the multi-assistant component 115 may receive (step 508), from the virtual assistant component(s) 113, processing data for the virtual assistant. The processing data may be any data usable by a component of the user device 110 to perform processing as the virtual assistant. For example, the processing data may include a trained machine learning model for detecting a wakeword corresponding to the virtual assistant. As another example, the processing data may include a trained machine learning model for performing ASR processing with respect to spoken natural language user inputs capable of being processed by the virtual assistant. For further example, the processing data may include a trained machine learning model for performing NLU processing with respect to natural language user input capable of being processed by the virtual assistant.

The multi-assistant component 115 may cause (step 510) at least one component, of the user device 110, to be configured using the processing data. For example, if the processing data includes a trained machine learning model for detecting a wakeword corresponding to the virtual assistant, the multi-assistant component 115 may cause a wakeword detection component 820 to be configured to implement the trained machine learning model. As another example, if the processing data includes a trained machine learning model for performing ASR processing with respect to spoken natural language user inputs capable of being processed by the virtual assistant, the multi-assistant component 115 may cause the virtual assistant component 140 or an ASR component 950 to be configured to implement the trained machine learning model. For further example, if the processing data includes a trained machine learning model for performing NLU processing with respect to natural language user input capable of being processed by the virtual assistant, the multi-assistant component 115 may cause the virtual assistant component 140 or a component 960 to be configured to implement the trained machine learning model.

After the configuration data is stored and after the at least one component is configured using the processing data, the multi-assistant component 115 may send (step 512) virtual assistant data to a virtual assistant component(s) 113 corresponding to the newly enabled virtual assistant. The purpose of the virtual assistant data is to provide the virtual assistant component(s) 113 with a record of the virtual assistant(s), corresponding to the foregoing virtual assistant component(s) 113, presently enabled and implemented by the user device 110 so that the virtual assistant component(s) 113 can know which messages and/or directives can be sent to the user device 110.

Virtual assistant data may include the configuration data for a virtual assistant.

In some embodiments, in response to the virtual assistant component(s) 113 receiving the virtual assistant data, the virtual assistant component(s) 113 may cause a companion application, installed on the user device 110, to include a graphical user interface configured to present the virtual assistant data (e.g., virtual assistant name). In some embodiments, the virtual assistant component(s) 113 may cause a user device, different from but associated with the user device 110 such as by being represented in the same group profile data, to present the virtual assistant data via a display.

In some embodiments, in response to receiving virtual assistant data from a user device 110, the virtual assistant component(s) 113 may determine another user device associated with the user device 110 (e.g., another user device indicated in a same group profile as the user device 110), and may send the processing data (sent to the user device at step 508) to the other user device such that the virtual assistant becomes enabled at the other user device.

In some embodiments, in response to receiving virtual assistant data, the virtual assistant component(s) 113 may update user profile data and/or device profile data of the user device 110 to include or otherwise represent at least some of the virtual assistant data. This may result in the synchronization of settings of the user device 110 in the virtual assistant component(s) 113.

After the at least one component of the user device 110 is configured using the processing data, and optionally after the virtual assistant data is sent to the virtual assistant component(s) 113, the routing client 305 may send (step 514), to the multi-assistant component 115 (e.g., using a send message function of the multi-assistant component 115), a message request object, including a virtual assistant identifier, and event data. In this context, the routing client 305 may be any component, device, or system that is a client of the multi-assistant component 115 and which is configured to send event data intended for a virtual assistant of the system 100.

Using the configuration data, the multi-assistant component 115, and more particularly the routing component 250 thereof, may determine (step 516 illustrated in FIG. 5B) the resource identifiers, of the virtual assistant component 140 and the virtual assistant component(s) 113, that are associated with the virtual assistant identifier as represented in the message request object. This can be a lookup of the resource identifier using the virtual assistant identifier. Where there are multiple resource identifiers, the enablement setting, policies, and/or capabilities associated with each resource identifier can be matched to determine the resource identifier.

The multi-assistant component 115, and more particularly the routing component 250 thereof, may generate (step 518) message data including at least the event data received at step 514.

Based on the configuration data including the resource identifiers of the virtual assistant component 140 and the virtual assistant component(s) 113 as being associated with the virtual assistant identifier as provided in the message request object, the multi-assistant component 115, and more particularly the routing component 250 thereof, may send (step 520a) the message data to the virtual assistant component 140, as well as send (step 520b) the message data to the virtual assistant component(s) 113.

In situations where the virtual assistant component 140 is capable of processing (step 522a) the message data to determine directive data, the virtual assistant component 140 may send (step 524a) the directive data to the multi-assistant component 115, and more particularly the routing component 250. Additionally or alternatively, in situations where the virtual assistant component(s) 113 is capable of processing (step 522b) the message data to determine directive data, the virtual assistant component(s) 113 may send (step 524b) the directive data to the multi-assistant component 115, and more particularly the routing component 250.

Using the configuration data, the multi-assistant component 115, and more particularly the routing component 250 thereof, may generate (step 526 illustrated in FIG. 5C) directive data tagged with the virtual assistant identifier, where this directive data corresponds to the directive data of steps 524a and 524b that is received first-in-time by the multi-assistant component 115. In some embodiments, the first-in-time received directive data may be tagged with the virtual assistant identifier when the directive data is received from the virtual assistant component 140 or the virtual assistant component(s) 113. In embodiments where the directive data is not tagged with the virtual assistant identifier when the directive data is received, the multi-assistant component 115 may determine the resource identifier, of the virtual assistant component 140 or virtual assistant component(s) 113 from which the first-in-time directive data was received, is associated with the virtual assistant identifier in the configuration data, and based thereon may tag the determined virtual assistant identifier to the directive data received at step 424.

Thereafter, the multi-assistant component 115, and more particularly the routing component 250, send (step 528), to the routing client 305 (i.e., the source of the message request object and the event data received at step 514), the directive data tagged with the virtual assistant identifier.

Over time, various metrics may be determined for a virtual assistant. For example, a latency metric may be determined for traffic for each resource identifier associated with a virtual assistant identifier. As another example, a failure count may be determined for each resource identifier associated with a virtual assistant identifier. For further example, a metric may be determined with respect to the incorrect tagging of assistant identifiers to directive data.

In some embodiments of the present disclosure, the multi-assistant component 115 may be configured to receive directive data from a device in communication with the user device 110 via one or more networks, and, to prevent unintended directives from being processed by a virtual assistant, the multi-assistant component 115 may, prior to sending the directive data to a virtual assistant component 140 or assistant component(s) 113 of the virtual assistant, verify that the virtual assistant is authorized to perform the commanded processing.

Figure 6:
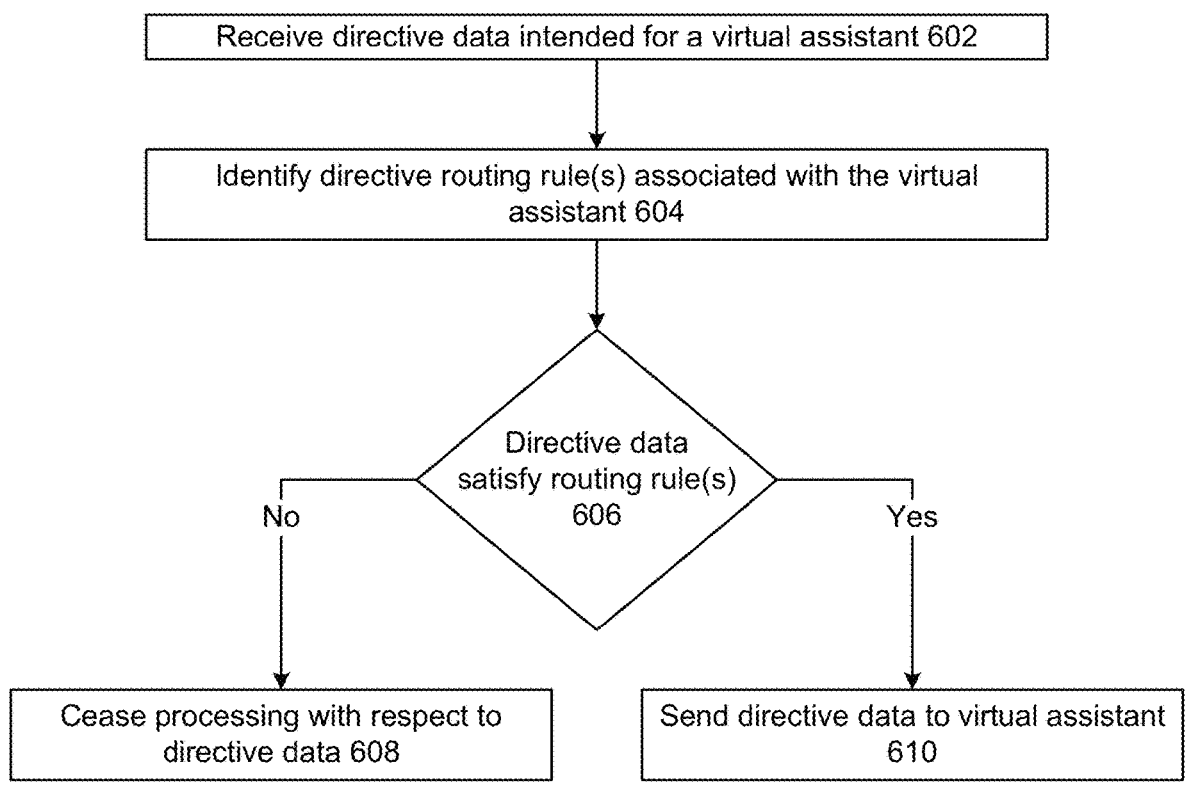
FIG. 6 is a process flow diagram for verifying a virtual assistant is authorized to process a received directive, according to embodiments of the present disclosure.

With reference to FIG. 6, the multi-assistant component 115 may receive (step 602) directive data intended for a virtual assistant, and more particularly a virtual assistant component 140 or a virtual assistant component(s) 113. The multi-assistant component 115 may receive the directive data from a routing client 305, and more particularly a device in communication with the user device 110 via one or more networks.

The multi-assistant component 115 may store directive routing rules, where a directive routing rule indicates one or more types of processing that are enabled for a virtual assistant, and/or one or more types of processing that are disabled for a virtual assistant. A directive routing rule may be specific to (i.e., associated with) a virtual assistant identifier. Alternatively, a directive routing rule may be specific to (i.e., associated with) a particular virtual assistant component 140 or assistant component(s) 113.

The multi-assistant component 115 may identify (step 604) one or more routing rules associated with the virtual assistant, and more particular associated with the virtual assistant identifier of the virtual assistant, and more particularly the resource identifier of the virtual assistant component 140 or a virtual assistant component(s) 113 of the virtual assistant.

The multi-assistant component 115 may determine (step 606) whether the directive data satisfies the one or more of the routing rule(s). In other words, the multi-assistant component 115 may determine whether the directive data is enabled for being processed by the virtual assistant.

If the multi-assistant component 115 determines the directive data does not satisfy any of the routing rule(s) associated with the virtual assistant identifier (i.e., is not enabled to be processed by the virtual assistant), then the multi-assistant component 115 may cease (step 608) processing with respect to the directive data. Conversely, if the multi-assistant component 115 determines the directive data satisfies at least one of the routing rule(s) (i.e., determines the virtual assistant is enabled to process the directive data), then the multi-assistant component 115 may send (step 610) the directive data to the virtual assistant (i.e., a virtual assistant component 140 and/or a virtual assistant component(s) 113 of the virtual assistant.

In some embodiments of the present disclosure, the multi-assistant component 115 may be configured to receive directive data from a virtual assistant component 140 or virtual assistant component(s) 113 and, to prevent unintended directives from being sent by a virtual assistant, the multi-assistant component 115 may, prior to sending the directive data to its intended recipient, verify that the virtual assistant is authorized to send the directive data.

Figure 7:
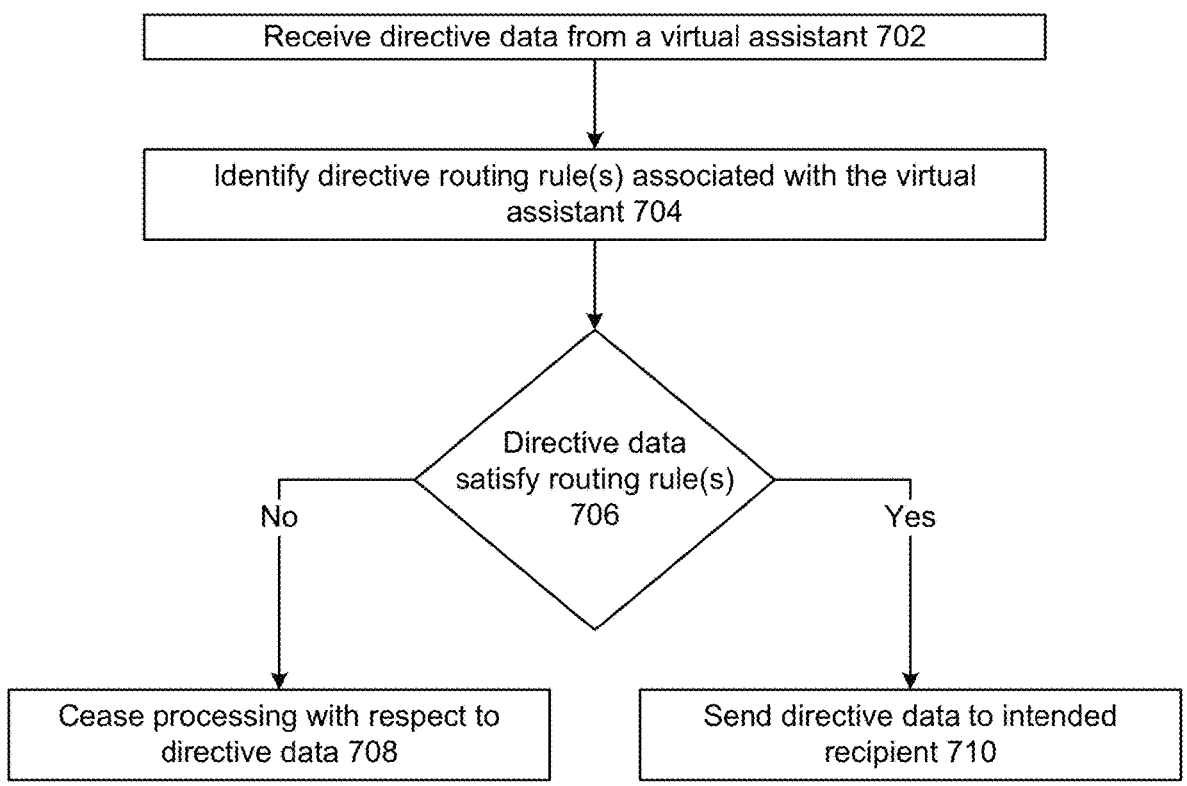
FIG. 7 is a process flow diagram for verifying a virtual assistant is authorized to send a directive, according to embodiments of the present disclosure.

With reference to FIG. 7, the multi-assistant component 115 may receive (step 702) directive data from a virtual assistant, and more particularly a virtual assistant component 140 or a virtual assistant component(s) 113.

The multi-assistant component 115 may store directive routing rules, where a directive routing rule indicates one or more types of directives that a virtual assistant is enabled to send, and/or one or more types of directives that a virtual assistant is not permitted to send. A directive routing rule may be specific to (i.e., associated with) a virtual assistant identifier. Alternatively, a directive routing rule may be specific to (i.e., associated with) a particular virtual assistant component 140 or assistant component(s) 113.

The multi-assistant component 115 may identify (step 704) one or more routing rules associated with the virtual assistant, and more particular associated with the virtual assistant identifier of the virtual assistant, and more particularly the resource identifier of the virtual assistant component 140 or a virtual assistant component(s) 113 of the virtual assistant.

The multi-assistant component 115 may determine (step 706) whether the directive data satisfies the one or more of the routing rule(s). In other words, the multi-assistant component 115 may determine whether the virtual assistant is permitted to send the directive data.

If the multi-assistant component 115 determines the directive data does not satisfy any of the routing rule(s) associated with the virtual assistant identifier (i.e., the virtual assistant is not permitted to send the directive data), then the multi-assistant component 115 may cease (step 708) processing with respect to the directive data. Conversely, if the multi-assistant component 115 determines the directive data satisfies at least one of the routing rule(s) (i.e., determines the virtual assistant is enabled to send the directive data), then the multi-assistant component 115 may send (step 710) the directive data to the intended recipient.

Figure 8:
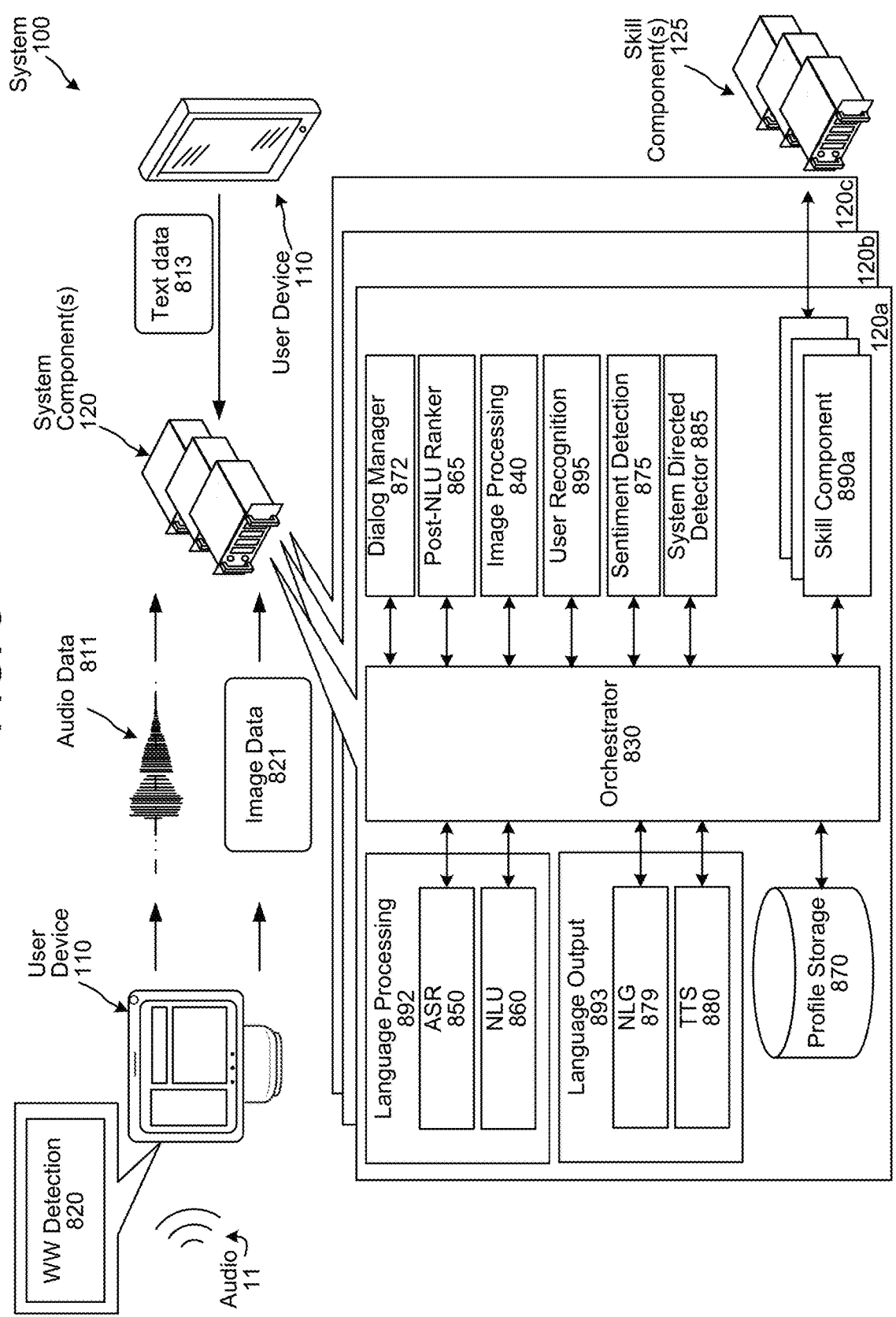
FIG. 8 is a conceptual diagram of components of the system, according to embodiments of the present disclosure.

The system 100 may operate using various components as described in FIG. 8. The various components may be located on same or different physical devices. Communication between various components may occur directly or across a network(s) 199. The user device 110 may include audio capture component(s), such as a microphone or array of microphones of a device 110, captures audio 11 and creates corresponding audio data. Once speech is detected in audio data representing the audio 11, the user device 110 may determine if the speech is directed at the user device 110/system component(s) 120. In at least some embodiments, such determination may be made using a wakeword detection component 820. The wakeword detection component 820 may be configured to detect various wakewords. In at least some examples, each wakeword may correspond to a name of a different digital assistant. An example wakeword/digital assistant name is "Alexa." In another example, input to the system may be in form of text data 813, for example as a result of a user typing an input into a user interface of device 110. Other input forms may include indication that the user has pressed a physical or virtual button on device 110, the user has made a gesture, etc. The user device 110 may also capture images using camera(s) 1018 of the user device 110 and may send image data 821 representing those image(s) to the system component(s) 120. The image data 821 may include raw image data or image data processed by the user device 110 before sending to the system component(s) 120. The image data 821 may be used in various manners by different components of the system to perform operations such as determining whether a user is directing an utterance to the system, interpreting a user command, responding to a user command, etc.

The wakeword detector 820 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 820 and/or input is detected by an input detector, the user device 110 may "wake" and begin transmitting audio data 811, representing the audio 11, to the system component(s) 120. The audio data 811 may include data corresponding to the wakeword; in other embodiments, the portion of the audio corresponding to the wakeword is removed by the user device 110 prior to sending the audio data 811 to the system component(s) 120. In the case of touch input detection or gesture based input detection, the audio data may not include a wakeword.

In some implementations, the system 100 may include more than one system component(s) 120. The component(s) 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detector 820 may result in sending audio data to system component(s) 120*a* for processing while detection of the wakeword "Computer" by the wakeword detector may result in sending audio data to system component(s) 120*b* for processing. The system may have a separate wakeword and system for different skills/systems (e.g., "Dungeon Master" for a game play skill/system component(s) 120*c*) and/or such skills/systems may be coordinated by one or more skill(s) 890 of one or more component(s) 120.

The user device 110 may also include a system directed input detector 985. (The system component(s) 120 may also include a system directed input detector 885 which may operate in a manner similar to system directed input detector 985.) The system directed input detector 985 may be configured to determine whether an input to the system (for example speech, a gesture, etc.) is directed to the system or not directed to the system (for example directed to another user, etc.). The system directed input detector 985 may work in conjunction with the wakeword detector 820. If the system directed input detector 985 determines an input is directed to the system, the user device 110 may "wake" and begin sending captured data for further processing (for example, processing audio data using the language processing 892/992, processing captured image data using image processing component 840/940 or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 985 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 985 is determining whether an input is potentially device directed. For example, the system may output an orange indicator while considering an input, and may output a green indicator if a system directed input is detected. Other such configurations are possible.

Upon receipt by the system component(s) 120, the audio data 811 may be sent to an orchestrator component 830. The orchestrator component 830 may include memory and logic that enables the orchestrator component 830 to transmit various pieces and forms of data to various components of the system, as well as perform other operations as described herein.

The orchestrator component 830 may send the audio data 811 to a language processing component 892. The language processing component 892 (sometimes also referred to as a spoken language understanding (SLU) component) includes an automatic speech recognition (ASR) component 850 and a natural language understanding (NLU) component 860. The ASR component 850 may transcribe the audio data 811 into text data. The text data output by the ASR component 850 represents one or more than one (e.g., in the form of an N-best list) ASR hypotheses representing speech represented in the audio data 811. The ASR component 850 interprets the speech in the audio data 811 based on a similarity between the audio data 811 and pre-established language models. For example, the ASR component 850 may compare the audio data 811 with models for sounds (e.g., acoustic units such as phonemes, senons, phones, etc.) and sequences of sounds to identify words that match the sequence of sounds of the speech represented in the audio data 811. The ASR component 850 sends the text data generated thereby to an NLU component 860, via, in some embodiments, the orchestrator component 830. The text data sent from the ASR component 850 to the NLU component 860 may include a single top-scoring ASR hypothesis or may include an N-best list including multiple top-scoring ASR hypotheses. An N-best list may additionally include a respective score associated with each ASR hypothesis represented therein.

The speech processing system 892 may further include a NLU component 860. The NLU component 860 may receive the text data from the ASR component. The NLU component 860 may attempts to make a semantic interpretation of the phrase(s) or statement(s) represented in the text data input therein by determining one or more meanings associated with the phrase(s) or statement(s) represented in the text data. The NLU component 860 may determine an intent representing an action that a user desires be performed and may determine information that allows a device (e.g., the user device 110, the system component(s) 120, a skill component 890, a skill component(s) 125, etc.) to execute the intent. For example, if the text data corresponds to "play the 5th Symphony by Beethoven," the NLU component 860 may determine an intent that the system output music and may identify "Beethoven" as an artist/composer and "5th Symphony" as the piece of music to be played. For further example, if the text data corresponds to "what is the weather," the NLU component 860 may determine an intent that the system output weather information associated with a geographic location of the user device 110. In another example, if the text data corresponds to "turn off the lights," the NLU component 860 may determine an intent that the system turn off lights associated with the user device 110 or the user 5. However, if the NLU component 860 is unable to resolve the entity—for example, because the entity is referred to by anaphora such as "this song" or "my next appointment"—the speech processing system 892 can send a decode request to another speech processing system 892 for information regarding the entity mention and/or other context related to the utterance. The speech processing system 892 may augment, correct, or base results data upon the audio data 811 as well as any data received from the other speech processing system 892.

The NLU component 860 may return NLU results data (which may include tagged text data, indicators of intent, etc.) back to the orchestrator 830. The orchestrator 830 may forward the NLU results data to a skill component(s) 890. If the NLU results data includes a single NLU hypothesis, the NLU component 860 and the orchestrator component 830 may direct the NLU 1 results data to the skill component(s) 890 associated with the NLU hypothesis. If the NLU results data includes an N-best list of NLU hypotheses, the NLU component 860 and the orchestrator component 830 may direct the top scoring NLU hypothesis to a skill component(s) 890 associated with the top scoring NLU hypothesis. The system may also include a post-NLU ranker 865 which may incorporate other information to rank potential interpretations determined by the NLU component 860. The local device 110 may also include its own post-NLU ranker 965, which may operate similarly to the post-NLU ranker 865.

A skill component may be software running on the system component(s) 120 that is akin to a software application. That is, a skill component 890 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 890. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 890 may operate in conjunction between the system component(s) 120 and other devices, such as the user device 110, in order to complete certain functions. Inputs to a skill component 890 may come from speech processing interactions or through other interactions or input sources. A skill component 890 may include hardware, software, firmware, or the like that may be dedicated to a particular skill component 890 or shared among different skill components 890.

A skill component(s) 125 may communicate with a skill component(s) 890 within the system component(s) 120 and/or directly with the orchestrator component 830 or with other components. A skill component(s) 125 may be configured to perform one or more actions. An ability to perform such action(s) may sometimes be referred to as a "skill." That is, a skill may enable a skill component(s) 125 to execute specific functionality in order to provide data or perform some other action requested by a user. For example, a weather service skill may enable a skill component(s) 125 to provide weather information to the system component(s) 120, a car service skill may enable a skill component(s) 125 to book a trip with respect to a taxi or ride sharing service, an order pizza skill may enable a skill component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 890 dedicated to interacting with the skill component(s) 125. Unless expressly stated otherwise, reference to a skill, skill device, or skill component may include a skill component 890 operated by the system component(s) 120 and/or skill operated by the skill component(s) 125. Moreover, the functionality described herein as a skill or skill may be referred to using many different terms, such as an action, bot, app, or the like. The skill 890 and or skill component(s) 125 may return output data to the orchestrator 830.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) 120 may include a dialog manager component 872 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 872 may associate a dialog session identifier with the dialog upon identifying that the user is engaging in a dialog with the user. The dialog manager component 872 may track a user input and the corresponding system generated response to the user input as a turn. The dialog session identifier may correspond to multiple turns of user input and corresponding system generated response. The dialog manager component 872 may transmit data identified by the dialog session identifier directly to the orchestrator component 830 or other component. Depending on system configuration the dialog manager 872 may determine the appropriate system generated response to give to a particular utterance or user input of a turn. Or creation of the system generated response may be managed by another component of the system (e.g., the language output component 893, NLG 879, orchestrator 830, etc.) while the dialog manager 872 selects the appropriate responses. Alternatively, another component of the system component(s) 120 may select responses using techniques discussed herein. The text of a system generated response may be sent to a TTS component 880 for creation of audio data corresponding to the response. The audio data may then be sent to a user device (e.g., device 110) for ultimate output to the user. Alternatively (or in addition) a dialog response may be returned in text or some other form.

The dialog manager 872 may receive the ASR hypothesis/hypotheses (i.e., text data) and make a semantic interpretation of the phrase(s) or statement(s) represented therein. That is, the dialog manager 872 determines one or more meanings associated with the phrase(s) or statement(s) represented in the text data based on words represented in the text data. The dialog manager 872 determines a goal corresponding to an action that a user desires be performed as well as pieces of the text data that allow a device (e.g., the user device 110, the system component(s) 120, a skill 890, a skill component(s) 125, etc.) to execute the intent. If, for example, the text data corresponds to "what is the weather," the dialog manager 872 may determine that that the system component(s) 120 is to output weather information associated with a geographic location of the user device 110. In another example, if the text data corresponds to "turn off the lights," the dialog manager 872 may determine that the system component(s) 120 is to turn off lights associated with the device(s) 110 or the user(s) 5.

The dialog manager 872 may send the results data to one or more skill(s) 890. If the results data includes a single hypothesis, the orchestrator component 830 may send the results data to the skill(s) 890 associated with the hypothesis. If the results data includes an N-best list of hypotheses, the orchestrator component 830 may send the top scoring hypothesis to a skill(s) 890 associated with the top scoring hypothesis.

The system component(s) 120 includes a language output component 893. The language output component 893 includes a natural language generation (NLG) component 879 and a text-to-speech (TTS) component 880. The NLG component 879 can generate text for purposes of TTS output to a user. For example the NLG component 879 may generate text corresponding to instructions corresponding to a particular action for the user to perform. The NLG component 879 may generate appropriate text for various outputs as described herein. The NLG component 879 may include one or more trained models configured to output text appropriate for a particular input. The text output by the NLG component 879 may become input for the TTS component 880 (e.g., output text data). Alternatively or in addition, the TTS component 880 may receive text data from a skill 890 or other system component for output.

The NLG component 879 may include a trained model. The NLG component 879 generates text data (or other data representing text) from dialog data received by the dialog manager 872 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media 5 program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 880.

The TTS component 880 may generate audio data (e.g., synthesized speech) from text data using one or more different methods. Text data input to the TTS component 880 may come from a skill component 890, the orchestrator component 830, or another component of the system. In one method of synthesis called unit selection, the TTS component 880 matches text data against a database of recorded speech. The TTS component 880 selects matching units of recorded speech and concatenates the units together to form audio data. In another method of synthesis called parametric synthesis, the TTS component 880 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 811 representing the commands to the system 6 component(s) 120 for processing, after which the system component(s) 120 may return output data that can cause the user device 110 to engage its camera.

Upon receipt by the system component(s) 120, the image data 821 may be sent to an orchestrator component 830. The orchestrator component 830 may send the image data 821 to an image processing component 840. The image processing component 840 can perform computer vision functions such as object recognition, modeling, reconstruction, etc. For example, the image processing component 840 may detect a person, face, etc. (which may then be identified using user recognition component 895). The device may also include an image processing component 940 which operates similarly to image processing component 840.

In some implementations, the image processing component 840 can detect the presence of text in an image. In such implementations, the image processing component 840 can recognize the presence of text, convert the image data to text data, and send the resulting text data via the orchestrator component 830 to the language processing component 892 for processing by the NLU component 860.

The system component(s) 120 may include a user recognition component 895. User recognition component 995 operates similarly to user recognition component 895.

The user-recognition component 895 may take as input the audio data 811 and/or text data output by the ASR component 850. The user-recognition component 895 may perform user recognition by comparing audio characteristics in the audio data 811 to stored audio characteristics of users. The user-recognition component 895 may also perform user recognition by comparing biometric data (e.g., fingerprint data, iris data, etc.), received by the system in correlation with the present user input, to stored biometric data of users assuming user permission and previous authorization. The user-recognition component 895 may further perform user recognition by comparing image data (e.g., including a representation of at least a feature of a user), received by the system in correlation with the present user input, with stored image data including representations of features of different users. The user-recognition component 895 may perform additional user recognition processes, including those known in the art.

The user-recognition component 895 determines scores indicating whether user input originated from a particular user. For example, a first score may indicate a likelihood that the user input originated from a first user, a second score may indicate a likelihood that the user 7 input originated from a second user, etc. The user-recognition component 895 also determines an overall confidence regarding the accuracy of user recognition operations.

Output of the user-recognition component 895 may include a single user identifier corresponding to the most likely user that originated the user input. Alternatively, output of the user-recognition component 895 may include an N-best list of user identifiers with respective scores indicating likelihoods of respective users originating the user input. The output of the user-recognition component 895 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 870 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the user device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 870 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 870 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 875 that may be configured to detect a sentiment of a user from audio data representing speech/utterances from the user, image data representing an image of the user, and/or the like. The sentiment detection component 875 may be included in system component(s) 120, as illustrated in FIG. 8, although the disclosure is not limited thereto and the sentiment detection component 875 may be included in other components without departing from the disclosure. For example the sentiment detection component 975 may be included in the user device 110, as a separate component, etc. Sentiment detection component 975 may operate similarly to sentiment detection component 875. The system component(s) 120 may use the sentiment detection component 875 to, for example, customize a response for a user based on an indication that the user is happy or frustrated.

In some embodiments, a virtual assistant component(s) 113 may be implemented as part of a system component(s) 120.

Figure 9:
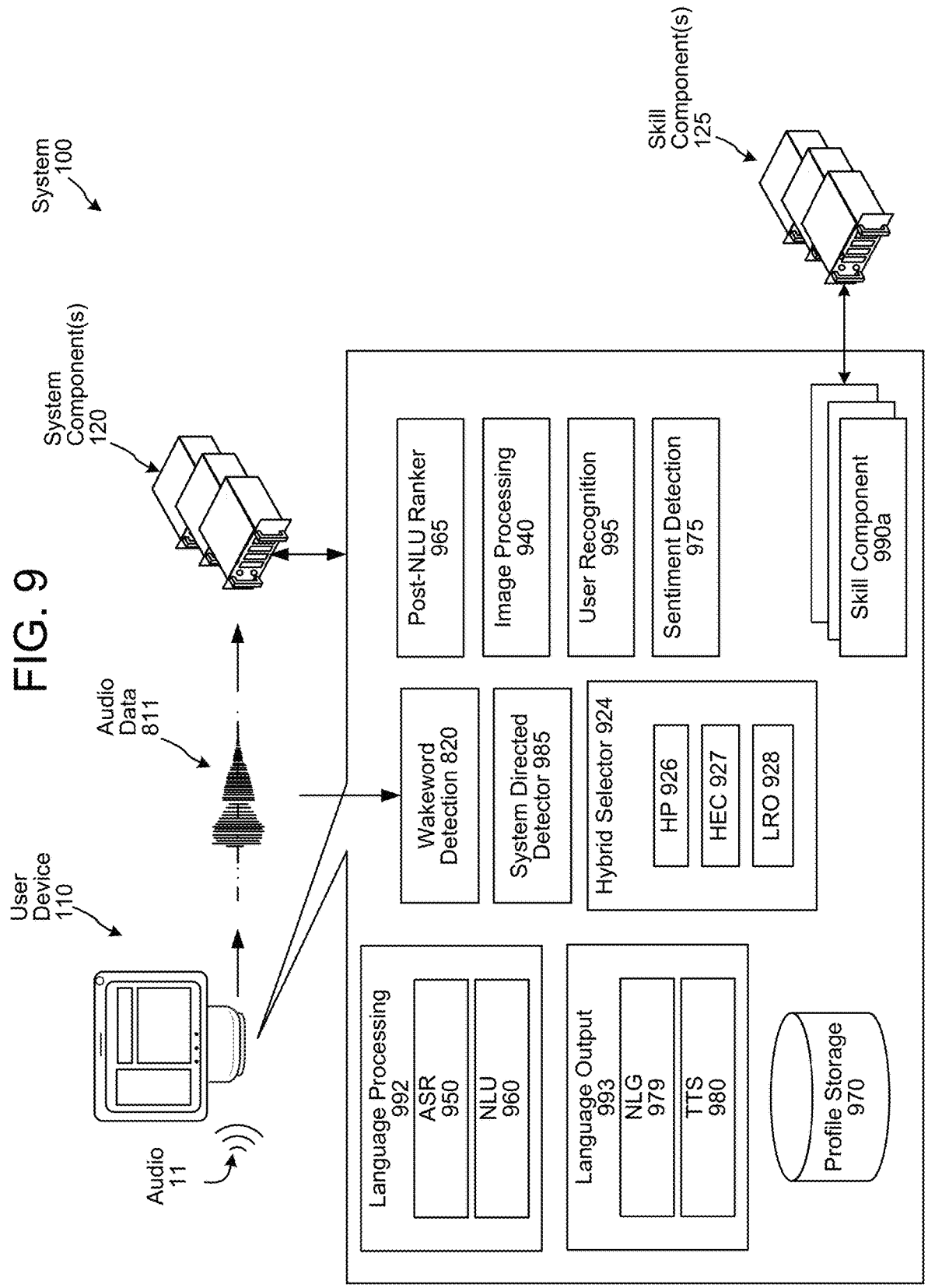
FIG. 9 is a conceptual diagram illustrating components that may be included in a user device, according to embodiments of the present disclosure.

Although the components of FIG. 8 may be illustrated as part of system component(s) 120, device 110, or otherwise, the components may be arranged in other device(s) (such as in device 110 if illustrated in system component(s) 120 or vice-versa, or in other device(s) 9 altogether) without departing from the disclosure. FIG. 9 illustrates such a configured device 110.

In at least some embodiments, the system component(s) 120 may receive the audio data 811 from the user device 110, to recognize speech corresponding to a spoken input in the received audio data 811, and to perform functions in response to the recognized speech. In at least some embodiments, these functions involve sending directives (e.g., commands), from the system component(s) 120 to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may instruct the user device 110 to output an audible response (e.g., using TTS processing performed by an on-device TTS component 980) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 8, the user device 110 may include a wakeword detection component 820 configured to compare the audio data 811 to stored models used to detect a wakeword (e.g., "Alexa") that indicates to the user device 110 that the audio data 811 is to be processed for determining NLU output data (e.g., slot data that corresponds to a named entity, label data, and/or intent data, etc.). In at least some embodiments, a hybrid selector 924, of the user device 110, may send the audio data 811 to the wakeword detection component 820. If the wakeword detection component 820 detects a wakeword in the audio data 811, the wakeword detection component 820 may send an indication of such detection to the hybrid selector 924. In response to receiving the indication, the hybrid selector 924 may send the audio data 811 to the system component(s) 120 and/or the ASR component 950. The wakeword detection component 820 may also send an indication, to the hybrid selector 924, representing a wakeword was not detected. In response to receiving such an indication, the hybrid selector 924 may refrain from sending the audio data 811 to the system component(s) 120, and may prevent the ASR component 950 from further processing the audio data 811. In this situation, the audio data 811 can be discarded.

The user device 110 may conduct its own speech processing using on-device language processing components, such as an SLU/language processing component 992 (which may include an ASR component 950 and an NLU 960), similar to the manner discussed herein with respect to the SLU component 892 (or ASR component 850 and the NLU component 860) of the system component(s) 120. Language processing component 992 may operate similarly to language processing component 892, ASR component 950 may operate similarly to ASR component 850 and NLU component 960 may operate similarly to NLU component 860. The user device 110 may also internally include, or otherwise have access to, other components such as one or more skill components 990 capable of executing commands based on NLU output data or other results determined by the user device 110/system component(s) 120 (which may operate similarly to skill components 890), a user recognition component 995 (configured to process in a similar manner to that discussed herein with respect to the user recognition component 895 of the system component(s) 120), profile storage 970 (configured to store similar profile data to that discussed herein with respect to the profile storage 870 of the system component(s) 120), or other components. In at least some embodiments, the profile storage 970 may only store profile data for a user or group of users specifically associated with the user device 110. Similar to as described above with respect to skill component 890, a skill component 990 may communicate with a skill component(s) 125. The user device 110 may also have its own language output component 993 which may include NLG component 979 and TTS component 980. Language output component 993 may operate similarly to language processing component 893, NLG component 979 may operate similarly to NLG component 879 and TTS component 980 may operate similarly to TTS component 880.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s) 120.

The hybrid selector 924, of the user device 110, may include a hybrid proxy (HP) 926 configured to proxy traffic to/from the system component(s) 120. For example, the HP 926 may be configured to send messages to/from a hybrid execution controller (HEC) 927 of the hybrid selector 924. For example, command/directive data received from the system component(s) 120 can be sent to the HEC 927 using the HP 926. The HP 926 may also be configured to allow the audio data 811 to pass to the system component(s) 120 while also receiving (e.g., intercepting) this audio data 811 and sending the audio data 811 to the HEC 927.

In some embodiments, the hybrid selector 924 may be implemented as part of the multi-assistant component 115. In some embodiments, the multi-assistant component 115 may be implemented as part of the hybrid selector 924. In some embodiments, the user device 110 may implement the hybrid selector 924 as a separate component from the multi-assistant component 115.

In at least some embodiments, the hybrid selector 924 may further include a local request orchestrator (LRO) 928 configured to notify the ASR component 950 about the availability of new audio data 811 that represents user speech, and to otherwise initiate the operations of local language processing when new audio data 811 becomes available. In general, the hybrid selector 924 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 811 is received, the HP 926 may allow the audio data 811 to pass through to the system component(s) 120 and the HP 926 may also input the audio data 811 to the on-device ASR component 950 by routing the audio data 811 through the HEC 927 of the hybrid selector 924, whereby the LRO 928 notifies the ASR component 950 of the audio data 811. At this point, the hybrid selector 924 may wait for response data from either or both of the system component(s) 120 or the local language processing components. However, the disclosure is not limited thereto, and in some examples the hybrid selector 924 may send the audio data 811 only to the local ASR component 950 without departing from the disclosure. For example, the user device 110 may process the audio data 811 locally without sending the audio data 811 to the system component(s) 120.

The local ASR component 950 is configured to receive the audio data 811 from the hybrid selector 924, and to recognize speech in the audio data 811, and the local NLU component 960 is configured to determine a user intent from the recognized speech, and to determine how to act on the user intent by generating NLU output data which may include directive data (e.g., instructing a component to perform an action). Such NLU output data may take a form similar to that as determined by the NLU component 860 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 960) may be selected as usable to respond to a natural language user input, and local response data may be sent (e.g., local NLU output data, local knowledge base information, internet search results, and/or local directive data) to the hybrid selector 924, such as a "ReadyToExecute" response. The hybrid selector 924 may then determine whether to use directive data from the on-device components to respond to the natural language user input, to use directive data received from the system component(s) 120, assuming a remote response is even received (e.g., when the user device 110 is able to access the system component(s) 120 over the network(s) 199), or to determine output audio requesting additional information from the user 5.

The user device 110 and/or the system component(s) 120 may associate a unique identifier with each natural language user input. The user device 110 may include the unique identifier when sending the audio data 811 to the system component(s) 120, and the response data from the system component(s) 120 may include the unique identifier to identify which natural language user input the response data corresponds.

In at least some embodiments, the user device 110 may include, or be configured to use, one or more skill components 990 that may work similarly to the skill component(s) 890 implemented by the system component(s) 120. The skill component(s) 990 may correspond to one or more domains that are used in order to determine how to act on a spoken input in a particular way, such as by outputting a directive that corresponds to the determined intent, and which can be processed to implement the desired operation. The skill component(s) 990 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill components 125. For example, a skill component(s) 125 may be located in a remote environment (e.g., separate location) such that the user device 110 may only communicate with the skill component(s) 125 via the network(s) 199. However, the disclosure is not limited thereto. For example, in at least some embodiments, a skill component(s) 125 may be configured in a local environment (e.g., home server and/or the like) such that the user device 110 may communicate with the skill component(s) 125 via a private network, such as a local area network (LAN).

As used herein, a "skill" may refer to a skill component 990, a skill component(s) 125, or a combination of a skill component 990 and a corresponding skill component(s) 125.

Similar to the manner discussed with regard to FIG. 8, the local device 110 may be configured to recognize multiple different wakewords and/or perform different categories of tasks depending on the wakeword. Such different wakewords may invoke different processing components of local device 110 (not illustrated in FIG. 9). For example, detection of the wakeword "Alexa" by the wakeword detector 820 may result in sending audio data to certain language processing components 992/skills 990 for processing while detection of the wakeword "Computer" by the wakeword detector may result in sending audio data different language processing components 992/skills 990 for processing.

Figure 10:
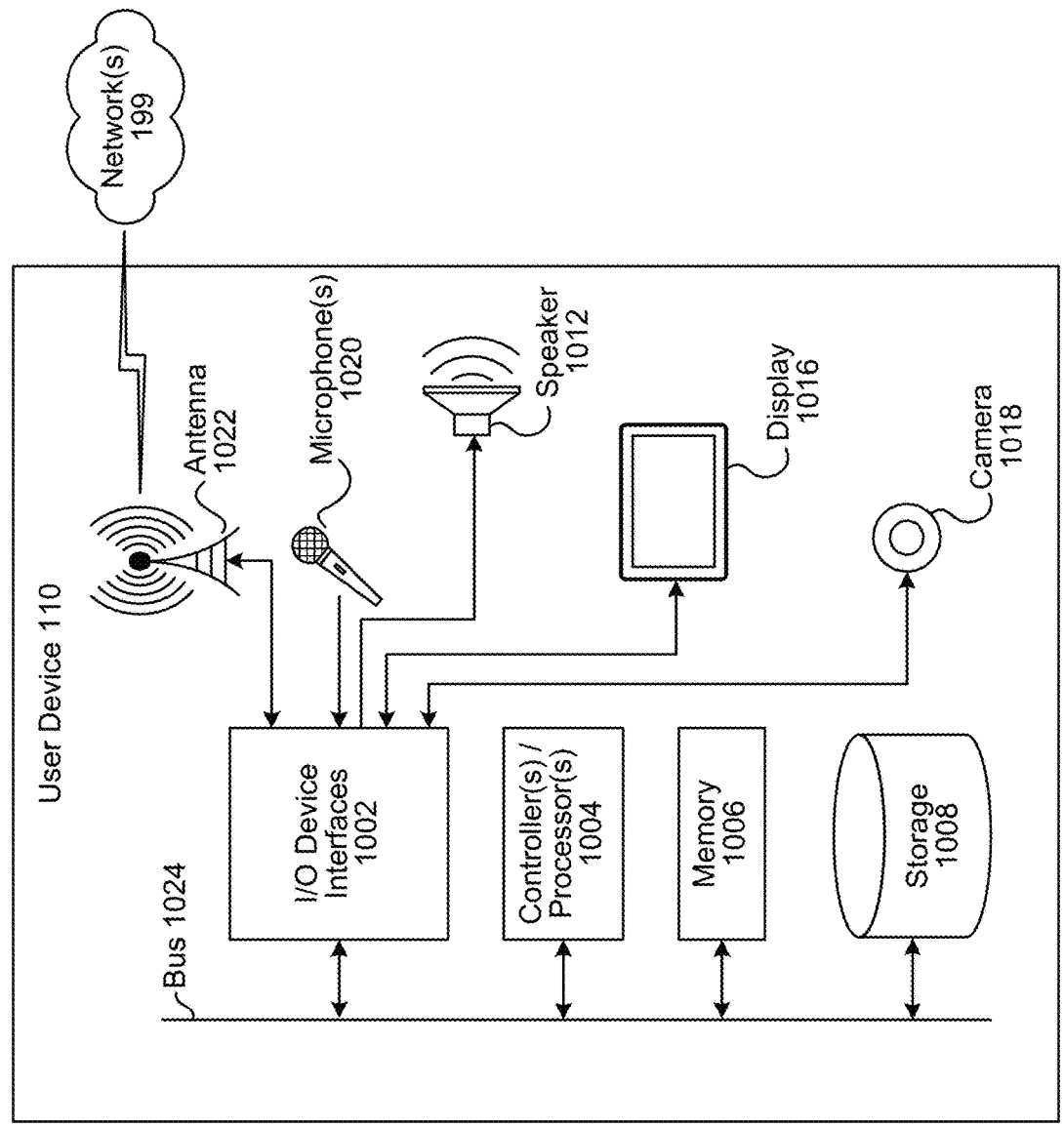
FIG. 10 is a block diagram conceptually illustrating example components of a user device, according to embodiments of the present disclosure.
Figure 11:
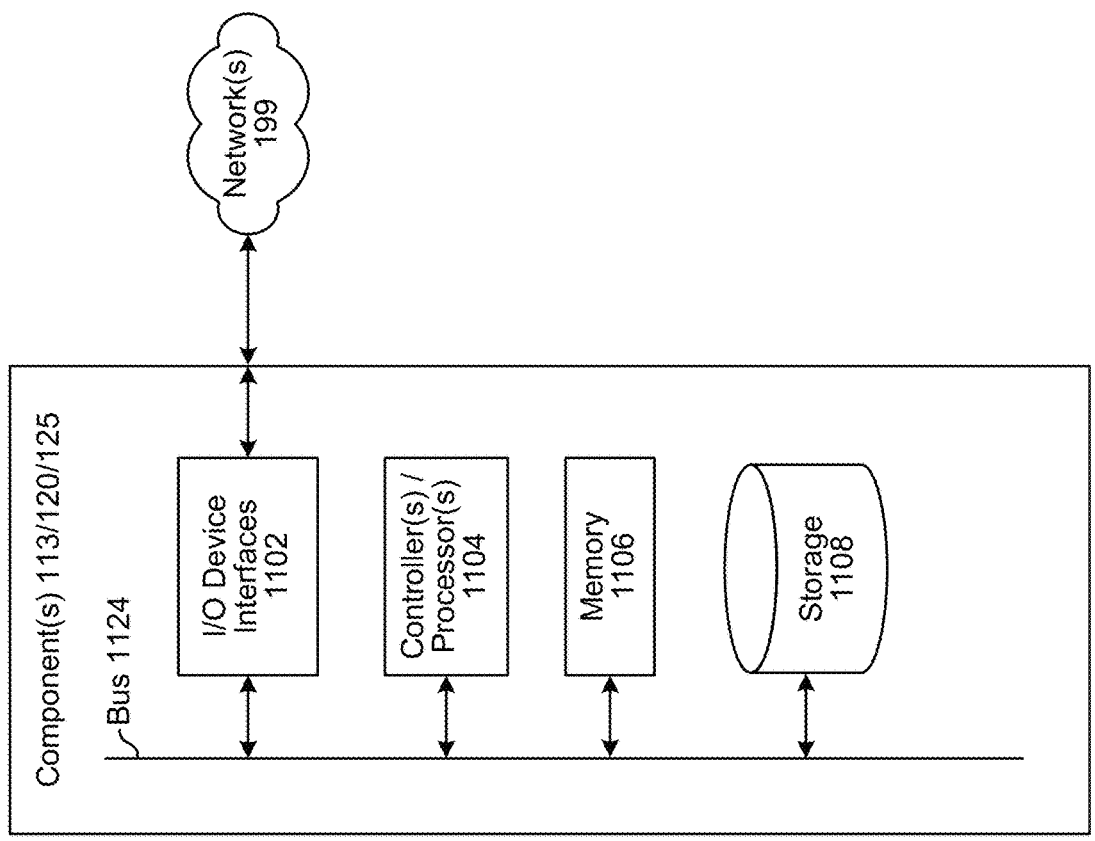
FIG. 11 is a block diagram conceptually illustrating example components of a system, according to embodiments of the present disclosure.

FIG. 10 is a block diagram conceptually illustrating a device 110 that may be used with the system. FIG. 11 is a block diagram conceptually illustrating example system components 113/120/125. A system component(s) (113/120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the system component(s) 113/120/125 may be located remotely from the user device 110 as its operations may not require proximity to the user. The system component(s) 113/120/125 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple system components (113/120/125) may be included in the system 100 of the present disclosure, such as one or more system components for performing ASR processing, one or more system components for performing NLU processing, one or more skill components 125, etc. In operation, each of these system components may include computer-readable and computer-executable instructions that reside on the respective system component(s) (113/120/125), as will be discussed further below.

Each of these components (110/113/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each component(s) (110/113/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each component(s) (110/113/120/125) may also be connected to removable or external non-volatile memory and/or storage (such as a removable memory card, memory key drive, networked storage, etc.) through respective input/output device interfaces (1002/1102).

Computer instructions for operating each component(s) (110/113/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each component(s) (110/113/120/125) includes input/output device interfaces (1002/1102). A variety of components may be connected through the input/output device interfaces (1002/1102), as will be discussed further below. Additionally, each component(s) (110/113/120/125) may include an address/data bus (1024/1124) for conveying data among components of the respective device. Each component within a component(s) (110/113/120/125) may also be directly connected to other components in addition to (or instead of) being connected to other components across the bus (1024/1124).

Referring to FIG. 10, the user device 110 may include input/output device interfaces 1002 that connect to a variety of components such as an audio output component such as a speaker 1012, a wired headset or a wireless headset (not illustrated), or other component capable of outputting audio. The user device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 1016 for displaying content. The user device 110 may further include a camera 1018.

Via antenna(s) 1022, the input/output device interfaces 1002 may connect to one or more networks via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the virtual assistant component(s) 113, the system component(s) 120, or a skill component(s) 125 may include their own dedicated processors, memory, and/or storage. Alternatively, one or more of the components of the device(s) 110, the virtual assistant component(s) 113, the system component(s) 120, or a skill component(s) 125 may utilize the I/O interfaces (1002/1102), processor(s) (1004/1104), memory (1006/1106), and/or storage (1008/1108) of the device(s) 110, natural language command processing system component(s) 120, or the skill component(s) 125, respectively. Thus, the ASR component 850 may have its own I/O interface(s), processor(s), memory, and/or storage; the NLU component 860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the virtual assistant component(s) 113, the system component(s) 120, and a skill component(s) 125, as described herein, are illustrative, and may be located as a stand-alone device or may be included, in whole or in part, as a component of a larger device or system. As can be appreciated, a number of components may exist either on a system component(s) 120 and/or on device 110. For example, language processing 892/992 (which may include ASR 850/950), language output 893/993 (which may include NLG 879/979 and TTS 880/980), etc., for example as illustrated in FIGS. 7 and 8. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 12, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110*j*, autonomously motile device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 850, the NLU component 860, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method performed by a user device, the computer-implemented method comprising:
   receiving, by the user device, first message request data including a first virtual assistant identifier, and first event data corresponding to the first message request data;
   determining that the first virtual assistant identifier, included in the first message request data, is associated with a first resource identifier of a first component of a first virtual assistant using configuration data associating the first virtual assistant identifier, wherein the first virtual assistant identifier corresponds to the first virtual assistant of a set of virtual assistants supported by the user device;
   generating first message data including the first event data;
   after determining that the first virtual assistant identifier is associated with the first resource identifier, sending the first message data to the first component of the first virtual assistant,
   after sending the first message data, receiving, from the first component of the first virtual assistant, first directive data associated with the first resource identifier;
   using the configuration data to determine that the first virtual assistant identifier is associated with the first resource identifier associated with the first directive data;
   after using the configuration data to determine that the first virtual assistant identifier is associated with the first resource identifier, generating second directive data associated with the first virtual assistant identifier; and
   sending the second directive data to a source of the first message request data and the first event data.

2. The computer-implemented method of claim 1, further comprising:
   receiving second message request data including the first virtual assistant identifier, and second event data corresponding to the second message request data;
   determining that the first virtual assistant identifier, included in the second message request data, is associated with a second resource identifier of a second component of the first virtual assistant using the configuration data, wherein the second component, of the first virtual assistant, is in communication with the user device over at least one network;
   generating second message data including the second event data; and after determining that the first virtual assistant identifier is associated with the second resource identifier, sending the second message data to the second component of the first virtual assistant.

3. The computer-implemented method of claim 1, further comprising:
receiving, by the user device and from a second component in communication with the user device via at least one network, second directive data intended for the first virtual assistant;
identifying a routing rule associated with the first virtual assistant identifier, wherein the routing rule indicates a type of processing permitted to be performed by the first component of the first virtual assistant;
determining the second directive data corresponds to the type of processing permitted to be performed by the first component of the first virtual assistant; and
based on determining that the second directive data corresponds to the type of processing permitted to be performed by the first component of the first virtual assistant, sending the second directive data to the first component for processing.

4. The computer-implemented method of claim 1, further comprising:
receiving a request to enable a second component to receive notification of a change in availability status of the first virtual assistant, wherein the request includes an identifier of the second component; and
based on receiving the request, storing an association between the first virtual assistant identifier and the identifier of the second component.

5. A computer-implemented method comprising:
receiving, by a user device, first event data associated with a first virtual assistant identifier;
using first configuration data stored by the user device for a first virtual assistant and including the first virtual assistant identifier and a first resource identifier for a first component of the first virtual assistant, determining that the first virtual assistant identifier, associated with the first event data, is associated with the first resource identifier; and
after using the first configuration data to determine that the first virtual assistant identifier is associated with the first resource identifier, sending the first event data to the first component for processing.

6. The computer-implemented method of claim 5, wherein:
the first configuration data further includes a second resource identifier for a second component implementing a portion of functionality of the first virtual assistant;
the second component is in communication with the user device via at least one network; and
the first configuration data including the first resource identifier and the second resource identifier enables the first virtual assistant to be implemented partially by the user device and partially by the second component.

7. The computer-implemented method of claim 6, further comprising:
receiving, by the user device, second event data associated with the first virtual assistant identifier;
using the first configuration data to determine that the first virtual assistant identifier, associated with the second event data, is associated with the first resource identifier and the second resource identifier; and
based on determining the first virtual assistant identifier is associated with the first resource identifier and the second resource identifier, sending the second event data to at least one of the first component and the second component for processing.

8. The computer-implemented method of claim 5, further comprising:
receiving, by the user device and from a second component in communication with the user device via at least one network, directive data intended for the first virtual assistant;
identifying a routing rule associated with the first virtual assistant identifier, wherein the routing rule indicates a type of processing permitted to be performed by the first component of the first virtual assistant;
determining the directive data corresponds to the type of processing permitted to be performed by the first component of the first virtual assistant; and
based on determining that the directive data corresponds to the type of processing permitted to be performed by the first component of the first virtual assistant, sending the directive data to the first component for processing.

9. The computer-implemented method of claim 5, further comprising:
receiving a request to enable a second component to receive notification of a change in availability status of the first virtual assistant, wherein the request includes an identifier of the second component; and
based on receiving the request, storing an association between the first virtual assistant identifier and the identifier of the second component.

10. The computer-implemented method of claim 5, further comprising:
receiving input data requesting the first virtual assistant be disabled; and
based on receiving the input data, deleting the first configuration data from the user device.

11. The computer-implemented method of claim 5, wherein the first configuration data further includes a virtual assistant name for the first virtual assistant, and wherein the computer-implemented method further comprises:
receiving input audio data corresponding to a spoken natural language user input including a wakeword;
determining the wakeword corresponds to the virtual assistant name; and
based on determining the wakeword corresponds to the virtual assistant name, determining that the spoken natural language user input is to be processed using at least one processing component of the first virtual assistant.

12. The computer-implemented method of claim 5, further comprising:
storing, by the user device, second configuration data for a second virtual assistant, the second configuration data including:
a second virtual assistant identifier; and
a second resource identifier corresponding to a second component of the second virtual assistant.

13. A computing system comprising:
at least one processor; and
at least one memory comprising instructions that, when executed by the at least one processor, cause the computing system to:
receive, by a user device, first event data associated with a first virtual assistant identifier;
using first configuration data stored by the user device for a first virtual assistant and including the first virtual assistant identifier and a first resource identifier for a first component of the first virtual assistant, determine that the first virtual assistant identifier, associated with the first event data, is associated with the first resource identifier; and after using the first configuration data to determine that the first virtual assistant identifier is associated with the first resource identifier, send the first event data to the first component for processing.

14. The computing system of claim 13, wherein:

the first configuration data further includes a second resource identifier for a second component implementing a portion of functionality of the first virtual assistant;

the second component is in communication with the user device via at least one network; and the first configuration data including the first resource identifier and the second resource identifier enables the first virtual assistant to be implemented partially by the user device and partially by the second component.

15. The computing system of claim 14, wherein the at least one memory further comprises instructions that, when executed by the at least one processor, further cause the computing system to:

receive, by the user device, second event data associated with the first virtual assistant identifier;

using the first configuration data, determine that the first virtual assistant identifier, associated with the second event data, is associated with the first resource identifier and the second resource identifier; and based on determining the first virtual assistant identifier is associated with the first resource identifier and the second resource identifier, send the second event data to at least one of the first component and the second component for processing.

16. The computing system of claim 13, wherein the at least one memory further comprises instructions that, when executed by the at least one processor, further cause the computing system to:

receive, by the user device and from a second component in communication with the user device via at least one network, directive data intended for the first virtual assistant;

identify a routing rule associated with the first virtual assistant identifier, wherein the routing rule indicates a type of processing permitted to be performed by the first component of the first virtual assistant;

determine the directive data corresponds to the type of processing permitted to be performed by the first component of the first virtual assistant; and based on determining that the directive data corresponds to the type of processing permitted to be performed by the first component of the first virtual assistant, send the directive data to the first component for processing.

17. The computing system of claim 13, wherein the at least one memory further comprises instructions that, when executed by the at least one processor, further cause the computing system to:

receive a request to enable a second component to receive notification of a change in availability status of the first virtual assistant, wherein the request includes an identifier of the second component; and based on receiving the request, store an association between the first virtual assistant identifier and the identifier of the second component.

18. The computing system of claim 13, wherein the at least one memory further comprises instructions that, when executed by the at least one processor, further cause the computing system to:

receive input data requesting the first virtual assistant be disabled; and based on receiving the input data, delete the first configuration data from the user device.

19. The computing system of claim 13, wherein the first configuration data further includes a virtual assistant name for the first virtual assistant, and wherein the at least one memory further comprises instructions that, when executed by the at least one processor, further cause the computing system to:

receive input audio data corresponding to a spoken natural language user input including a wakeword;

determine the wakeword corresponds to the virtual assistant name; and based on determining the wakeword corresponds to the virtual assistant name, determine that the spoken natural language user input is to be processed using at least one processing component of the first virtual assistant.

20. The computing system of claim 13, wherein the at least one memory further comprises instructions that, when executed by the at least one processor, further cause the computing system to:

store, by the user device, second configuration data for a second virtual assistant, the second configuration data including:

a second virtual assistant identifier; and a second resource identifier corresponding to a second component of the second virtual assistant.

* * * * *